United States Patent
Fujii et al.

(10) Patent No.: US 9,193,117 B2
(45) Date of Patent: Nov. 24, 2015

(54) METHOD FOR PRODUCTION IMAGING LENS UNIT

(75) Inventors: Takashi Fujii, Hachioji (JP); Hajime Mori, Fuchu (JP); Takemi Miyazaki, Hamura (JP)

(73) Assignee: Konica Minolta Advanced Layers, Inc., Tokyo (JP)

( * ) Notice: Subject to any disclaimer, the term of this patent is extended or adjusted under 35 U.S.C. 154(b) by 409 days.

(21) Appl. No.: 13/877,293

(22) PCT Filed: Sep. 9, 2011

(86) PCT No.: PCT/JP2011/070655
§ 371 (c)(1),
(2), (4) Date: Jun. 21, 2013

(87) PCT Pub. No.: WO2012/043197
PCT Pub. Date: Apr. 5, 2012

(65) Prior Publication Data
US 2013/0313730 A1    Nov. 28, 2013

(30) Foreign Application Priority Data

Sep. 30, 2010   (JP) ................................. 2010-223143

(51) Int. Cl.
| | |
|---|---|
| *B29C 45/04* | (2006.01) |
| *B29C 45/14* | (2006.01) |
| *B29D 11/00* | (2006.01) |
| *G02B 7/02* | (2006.01) |

(Continued)

(52) U.S. Cl.
CPC ...... *B29D 11/00009* (2013.01); *B29C 45/1671* (2013.01); *B29C 45/1675* (2013.01); *G02B 7/021* (2013.01); *G02B 13/003* (2013.01); *G02B 13/0085* (2013.01); *B29C 45/14008* (2013.01); *B29C 45/162* (2013.01); *B29C 2045/1673* (2013.01); *B29L 2011/0016* (2013.01)

(58) Field of Classification Search
None
See application file for complete search history.

(56) References Cited

U.S. PATENT DOCUMENTS

| | | | | |
|---|---|---|---|---|
| 8,659,838 | B2 * | 2/2014 | Konishi et al. | 359/714 |
| 8,817,396 | B2 * | 8/2014 | Mori et al. | 359/808 |

(Continued)

FOREIGN PATENT DOCUMENTS

| | | |
|---|---|---|
| JP | 2004-98547 | 4/2004 |
| JP | 2005-164649 | 6/2005 |

(Continued)

OTHER PUBLICATIONS

Office Action dated Sep. 24, 2014 (and a partial translation) issued in the corresponding Japanese Patent Application No. 2012-536320.

*Primary Examiner* — Ryan Ochylski
(74) *Attorney, Agent, or Firm* — Cozen O'Connor

(57) ABSTRACT

Method for manufacturing an image pickup lens unit. In the second molding step, by performing additional molding with respect to a first holder member 20 in which a lens 10 has been inserted, the separation of the lens 10 can be prevented and, at the same time, a second holder member 30 welded to the first holder member 20 can be molded. Therefore, molding of the second holder member 30 and the process of joining the second holder member with the first holder member 20 can be performed together. Additionally, when the lens 10 is fixed from the side of a third molding portion 63 of a second mold 52, the lens 10 and the third molding portion 63 are brought in contact by an elastic biasing force, thereby reducing breakage or deformation of the lens 10.

16 Claims, 19 Drawing Sheets

(51) Int. Cl.
*G02B 13/00* (2006.01)
*B29C 45/16* (2006.01)
*B29L 11/00* (2006.01)

(56) References Cited

U.S. PATENT DOCUMENTS

| | | | |
|---|---|---|---|
| 8,982,486 B2 * | 3/2015 | Mori et al. | 359/819 |
| 2012/0075721 A1 * | 3/2012 | Konishi et al. | 359/708 |
| 2012/0262805 A1 * | 10/2012 | Fujii et al. | 359/740 |
| 2012/0293878 A1 * | 11/2012 | Mori et al. | 359/754 |
| 2013/0271859 A1 * | 10/2013 | Mori et al. | 359/819 |
| 2014/0016215 A1 * | 1/2014 | Akutsu et al. | 359/811 |
| 2014/0016216 A1 * | 1/2014 | Mori et al. | 359/811 |
| 2014/0168796 A1 * | 6/2014 | Mori et al. | 359/819 |

FOREIGN PATENT DOCUMENTS

| | | |
|---|---|---|
| JP | 2006-181734 | 7/2006 |
| JP | 2008-195008 | 8/2008 |
| JP | 2008-221565 | 9/2008 |
| JP | 2009-300626 | 12/2009 |

\* cited by examiner

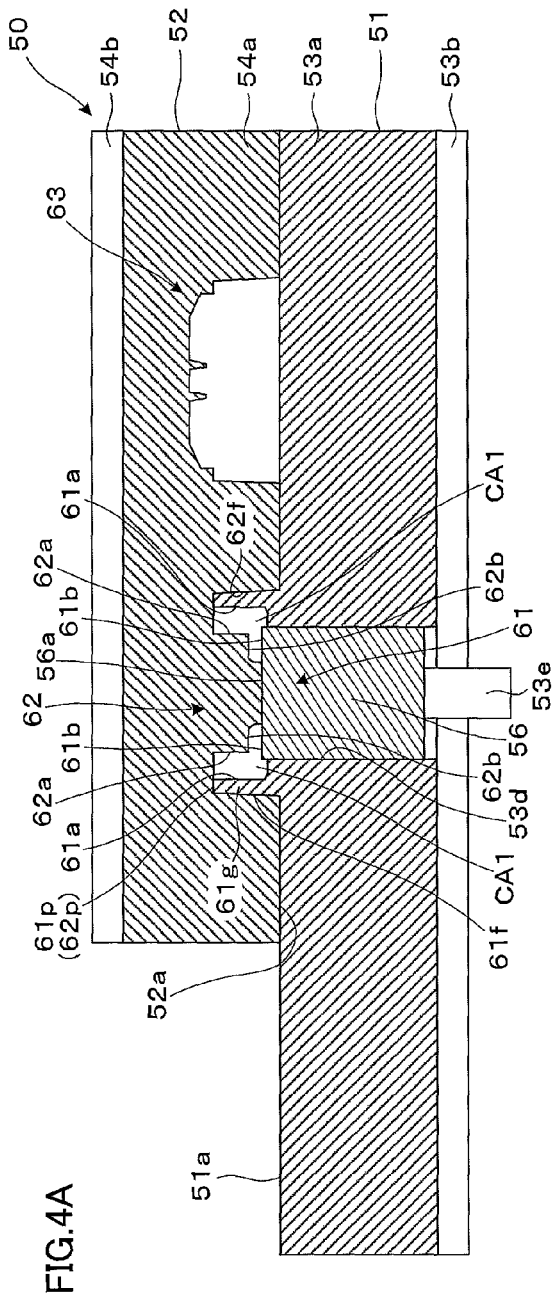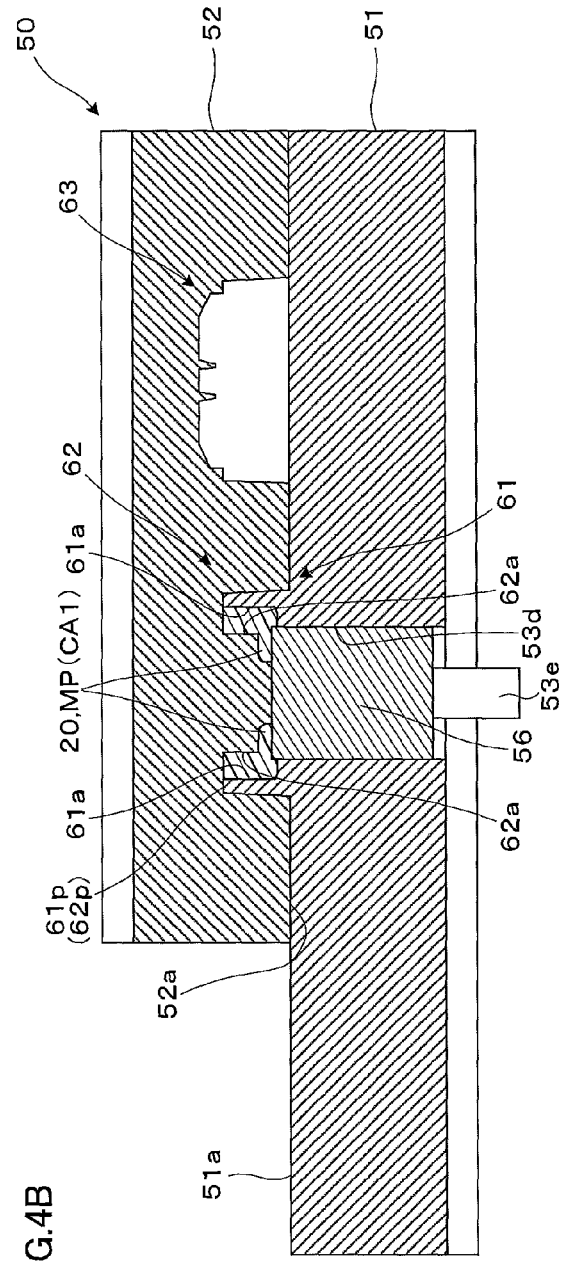

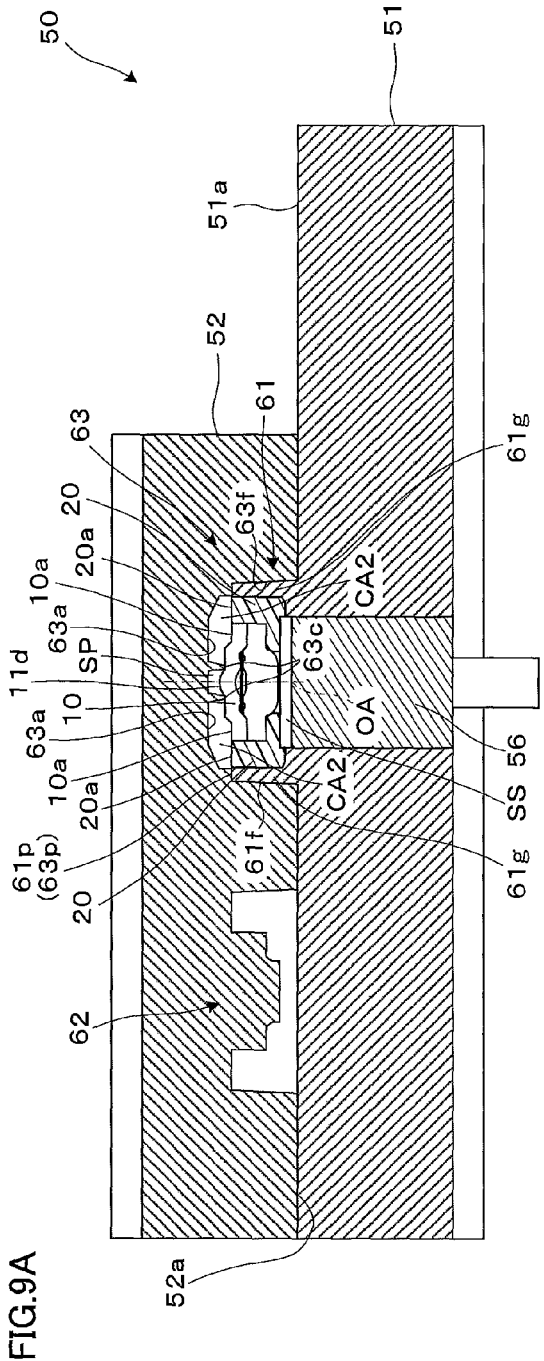
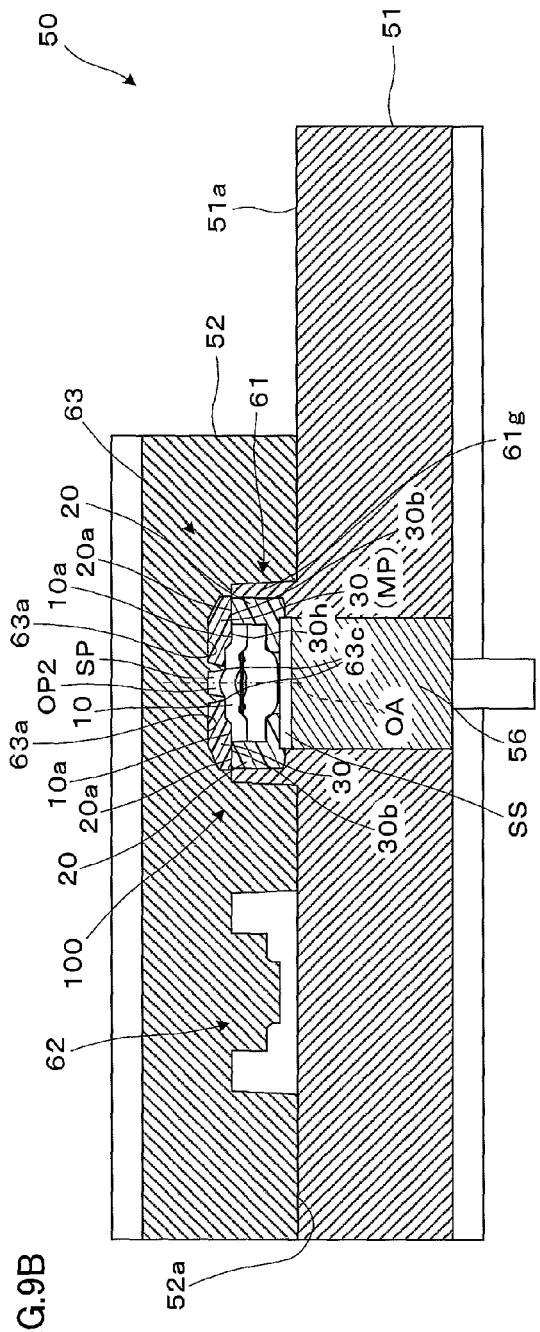
FIG.9A
FIG.9B

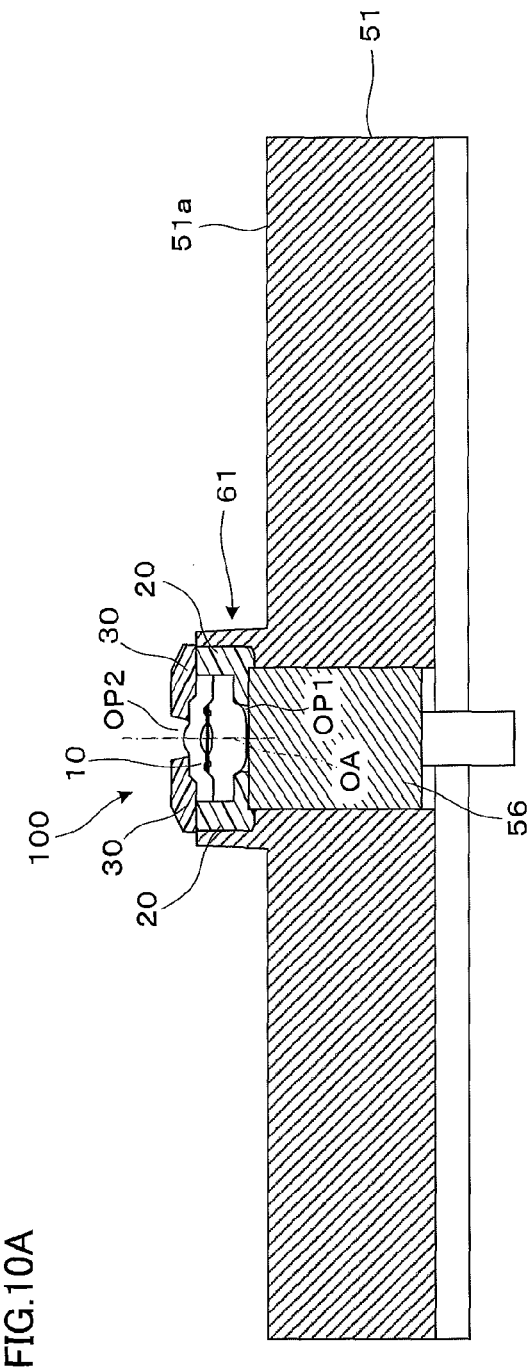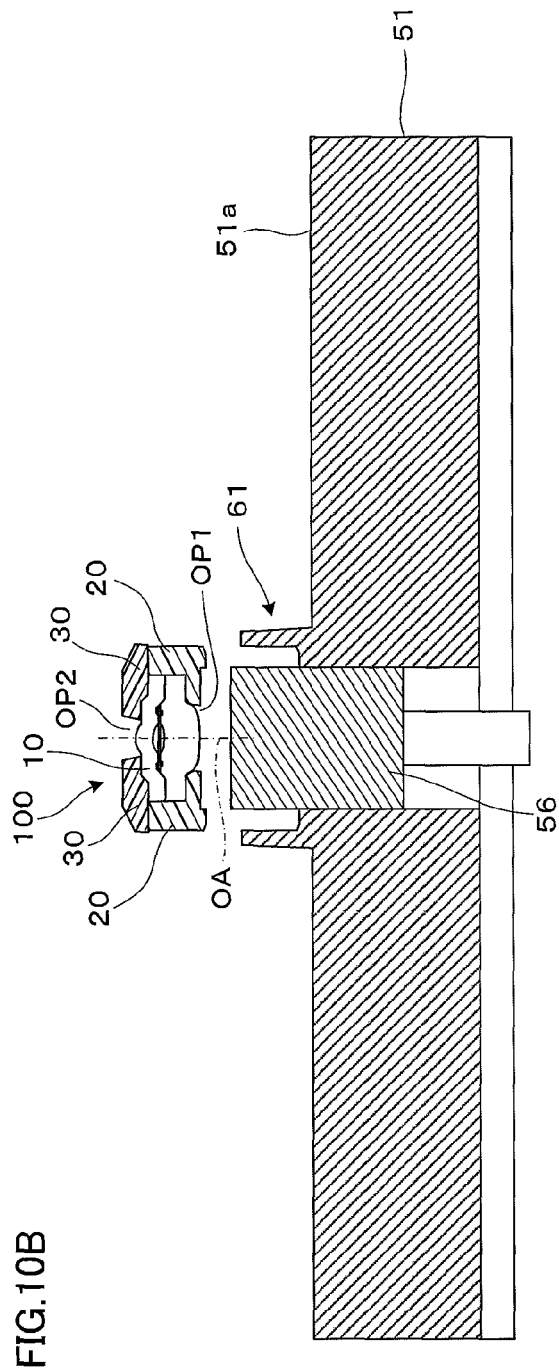

METHOD FOR PRODUCTION IMAGING LENS UNIT

RELATED APPLICATIONS

This is a U.S. national stage of application No. PCT/JP2011/070655 filed on Sep. 9, 2011.

This patent application claims the priority of Japanese application no. 2010-223143 filed Sep. 30, 2010, the disclosure content of which is hereby incorporated by reference.

TECHNICAL FIELD

The present invention relates to a method for manufacturing an image pickup lens having a lens mounted in a holder.

BACKGROUND ART

An image pickup lens unit incorporated in a mobile telephone or the like has a structure in which the periphery of the optical lens for imaging is held by a holder. Assembling the optical lens in to the holder is a task requiring extremely tight positioning accuracy, and is normally performed on an automatic assembly system using the image recognition technology. However, the above system is not only very expensive but also requires a very large space because production lines, are set up for different steps, such as a step of inserting a lens into a holder and a step of bonding the lens to the holder. As a result, facility replacement carried out for each change of lens type involves very extensive work, and hence many worker-hours are required.

A manufacturing method that addresses the problems described above is known. In this method, first, a plurality of resin optical lenses and a holder body and a cover for holding the optical lenses are individually molded in different portions of the same mold. Next, these resin members are moved and assembled while the holder body remains in the mold. Then, molding is performed again to form a molded assembly (see Patent Literature (PTL) 1).

Another manufacturing method is known in which, after an optical glass lens and a stop are positioned and set in a mold in advance, a holder is formed around the optical glass lens by injection molding to assemble an image-pickup lens unit at the same time (see PTL 2).

However, the manufacturing method disclosed in PTL 1 is disadvantageous in that it increases the number of molded components for joining the cover to the holder body and makes the molding step complicated. Additionally, since a resin flow path for such joining components needs to be created, it is very difficult to ensure filling properties and joint strength of a thin-wall holder used in an image-pickup lens unit to be included in mobile phones. Therefore, it is difficult to achieve downsizing desired for such an image-pickup lens unit to be included in mobile phones.

Also, in the manufacturing method disclosed in PTL 2, the optical lens and the stop need to be directly held between molds. If the holding force is not sufficient enough, resin that flows out through gaps may adhere to the optical surface of the optical lens or to the stop. On the other hand, if the holding force is too large, the optical lens or the stop may be deformed or damaged. Thus, since the allowable range of holding force is narrow, it is very difficult to carry out the holding operation. Additionally, since a positioning shape for positioning the lens is formed in the molds, the positioning shape may remain as a visible depression in the resulting molded part. Then, the entry of unnecessary light into the depression may cause optical defects, such as ghosts and flares. At the same time, visual specifications required for the image-pickup lens unit to be included in products, such as image-pickup apparatuses, may not be met. Moreover, such a positioning shape may cause deformation during mold releasing and may deteriorate the dimensional accuracy.

CITATION LIST

Patent Literature

PTL 1: Japanese Unexamined Patent Application Publication No. 2008-221565
PTL 2: Japanese Unexamined Patent Application Publication No. 2009-300626

SUMMARY OF INVENTION

An object of the present invention is to provide a method for manufacturing an image-pickup lens unit in which a holder body and a cover can be easily connected together without the need for additional components, the image-pickup lens unit can be made small in size, and it is possible to avoid the occurrence of ghosts and flares, visual defects, and deterioration of dimensional accuracy caused by the presence of a positioning shape.

In addition, the present invention is to provide a method for manufacturing an image pickup lens unit in which damage to a lens when setting the lens in a mold can be prevented.

The method for manufacturing an image pickup lens unit according to the present invention includes a lens having a first surface on which a first optical surface is formed and a second surface on which a second optical surface is formed on the opposite side of the first surface; a first holder member; and a second holder member configured to hold the lens so as to store the lens in cooperation with the first holder member, and includes a first molding step of filling in a resin material in a mold and then molding the first holder member having a positioning portion or section that is in contact with the second surface of the lens; a positioning step of inserting the lens in the first holder member present in the mold, and positioning the lens by bringing the lens in contact with the positioning portion of the first holder member; and a second molding step of bringing the lens and the mold in contact by an elastic biasing force at the time of fixing the lens from the side of the mold, filling in a resin material in the mold in the state where the lens has been positioned and fixed with respect to the first holder member, and then molding the second holder member such that the second holder member is welded to the first holder member placed inside the mold and having the lens positioned therein, the second holder member being configured to prevent the lens from falling off.

According to the above manufacturing method, in the second molding step, by performing molding with respect to the first holder member on which the lens is positioned, the second holder member preventing the separation of the lens is molded by welding to the first holder member, and therefore, the molding of the second holder member and joining with the first holder member can reliably be performed collectively, which can prevent an increase in the number of components for assembling the holder and also an increase in the complexity of the component shape in the connecting part. Particularly, because the second holder member and the first holder member can be welded by molding the second holder member, there is no need to provide a resin path for secondary molding in order to join the second holder member with the first holder member, in the first holder member, and therefore, an increase in the size of the image pickup unit can be prevented. Furthermore, because the second holder member is molded in the state where the lens is positioned on the first holder member, unlike the manufacturing method in which the positioning of the lens is performed using the positioning member provided in the mold only during molding, the deterioration in the dimension accuracy due to fact that a large positioning shape is left behind in the first holder member or the like as a gap or recess after the molding process can be avoided.

Finally, according to the above manufacturing method, because the lens and the mold are brought in contact by an elastic biasing force at the time of fixing the lens from the side of the mold, the impact on the lens is reduced thus enabling more reduction in breakage or deformation of the lens.

According to a specific aspect of the present invention, in the above manufacturing method, at least one of the positioning portion and a pressing member provided in the mold to press the first surface of the lens for fixing has an elastic portion configured to come in contact with at least a part of the first and the second surfaces of the lens and undergo elastic deformation. In such a case, by the elastic portion that is in direct contact with the first or second surfaces, the impact on the lens at the time of fixing can be controlled.

According to another aspect of the present invention, the positioning portion is configured to be displaced by facing a withdrawal space provided in a main body of the mold after the first molding step. In such a case, by the elasticity possessed by the positioning portion and its surroundings, the impact on the lens at the time of fixing the lens from the side of the mold can be controlled thereby reducing the breakage and deformation of the lens.

According to yet another aspect of the present invention, the positioning portion is supported by a member configured to be displaced elastically with respect to a main body of the mold. In such a case, even when a withdrawal space as described above is not provided, by the elasticity of the positioning portion supported by the member that cab be displaced, the impact on the lens at the time of fixing the lens from the side of the mold can be controlled, thereby reducing the breakage and deformation of the lens.

According to yet another aspect of the present invention, a pressing member provided in the mold to press the first surface of the lens for fixing has an elastic member configured to come in contact with at least a part of the first surface and undergo elastic deformation. In such a case, by the elastic member that is in direct contact with the first surface, the impact on the lens at the time of fixing can be controlled.

According to yet another aspect of the present invention, a pressing member provided in the mold to press the first surface of the lens for fixing is configured to be displaced elastically with respect to a main body of the mold. In such a case, the pressing member can be displaced elastically at the time of fixing, and the impact on the lens at the time of fixing can be controlled.

According to yet another aspect of the present invention, a pressing member provided in the mold to press the first surface of the lens for fixing is configured to support the first surface via a surface protection layer that covers at least a part of the first surface and undergoes elastic deformation. In such a case, by the surface protection layer interposed between the pressing member and the first surface, the impact on the lens at the time of fixing can be controlled.

According to yet another aspect of the present invention, at least a part of the lens is formed by an elastic material configured to undergo elastic deformation, and the pressing member provided in the mold to press the first surface of the lens supports at least one of the first optical surface or the remaining surface region excluding the first optical surface from the first surface. In such a case, by providing elasticity to the lens being fixed, the breakage and deformation and so forth of the lens can be reduced.

According to yet another aspect of the present invention, the first surface is supported by a contact surface having substantially the same shape as the first optical surface. In such a case, because the contact surface has a shape that is the same or almost the same as the first optical surface, the surface can come in contact with the entire optical surface, and because the resin used to form the second holder member is obstructed by the contact surface and the surrounding contact part, the leakage of the resin towards the side of the first optical surface can be prevented.

According to yet another aspect of the present invention, the first holder member has a contact surface facing the periphery or vicinity of the second optical surface of the lens. In such a case, even when the resin used to form the second holder member goes round toward the inner side of the first holder member, such a resin is obstructed by the contact part and can be prevented from leaking out towards the side of the optical surface.

According to yet another aspect of the present invention, the lens is either a single lens component or a lens assembly in which is an integrated combination of a plurality of lens elements. In such a case, the step of inserting and positioning the lens and the stop in the holder member becomes simple.

According to yet another aspect of the present invention, the lens assembly is an integrated combination of a plurality lens elements and a stop interposed between the plurality of lens elements. In such a case, the step of inserting and positioning the lens in the holder member becomes simple.

According to yet another aspect of the present invention, the lens has rectangular prism-like side surfaces. In such a case, individual lens elements can be easily cut out and used from a wafer-shaped base material in which several lenses are formed collectively.

According to yet another aspect of the present invention, a molding space for molding the lens is provided at a position different from the molding space for molding the holder member, in the mold. In such a case, the space required for the device for manufacturing the image pickup lens unit can be saved.

According to yet another aspect of the present invention, the holder member and the lens are formed from a reflow heat-resistant material. In such a case, the image pickup lens unit having heat resistance can be processed in a reflow step.

According to yet another aspect of the present invention, the movement of the lens is prevented by sucking in the lens from the mold side in the state where the lens is positioned by the positioning portion.

BRIEF DESCRIPTION OF DRAWINGS

FIG. 4(A) is a cross-sectional view for explaining the formation of a first cavity in the manufacturing apparatus, and FIG. 4(B) is a cross-sectional view for explaining the molding of a first holder member.

FIG. 9(A) is a cross-sectional view for explaining the formation of a second cavity in the manufacturing apparatus, and FIG. 9(B) is a cross-sectional view for explaining the molding of a second holder member.

FIG. 10(A) is a cross-sectional view for explaining the final mold opening in the manufacturing apparatus, and FIG. 10(B) is a cross-sectional view for explaining the extraction of the image pickup lens unit.

DESCRIPTION OF EMBODIMENTS

First Embodiment

In the following, with reference to drawings, a method for manufacturing an image pickup lens unit according to a first embodiment of the present invention will be described.

Figure 1:
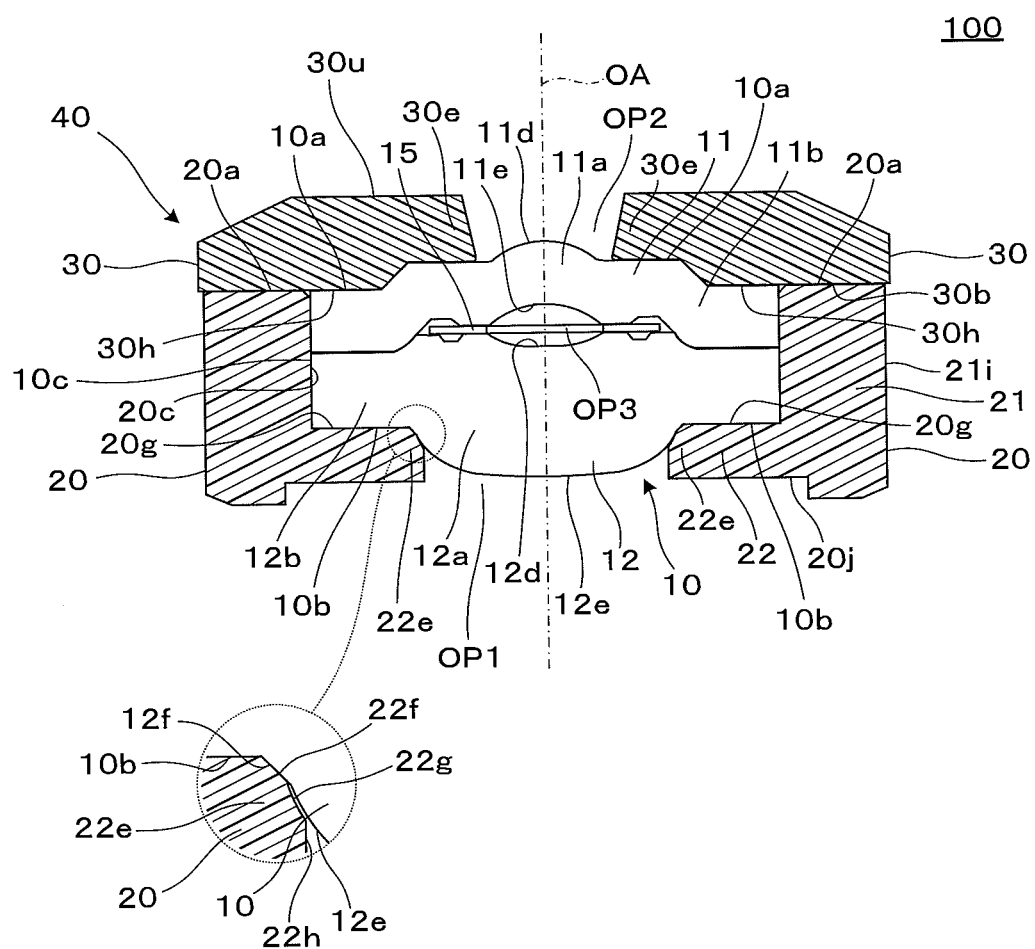
FIG. 1 is a side sectional view illustrating a structure of an image pickup lens unit according to a first embodiment.
Figure 2A:
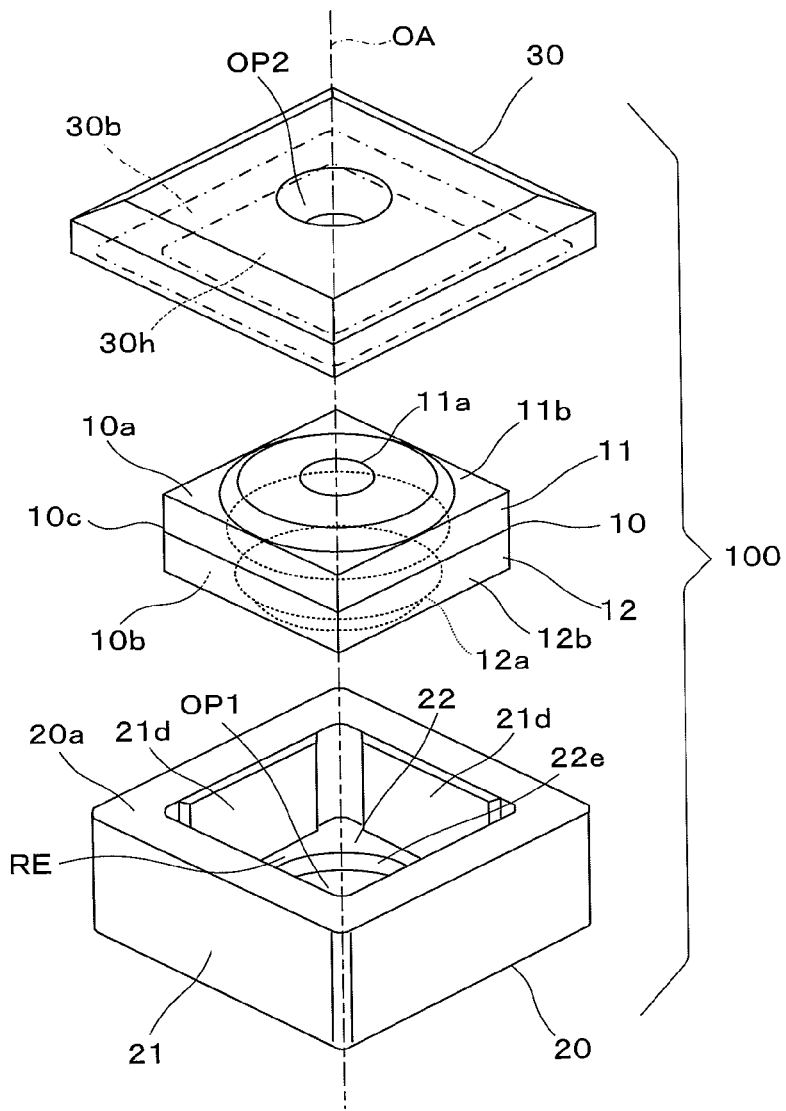
FIG. 2(A) is an exploded perspective view of the image pickup lens unit.
Figure 2B:
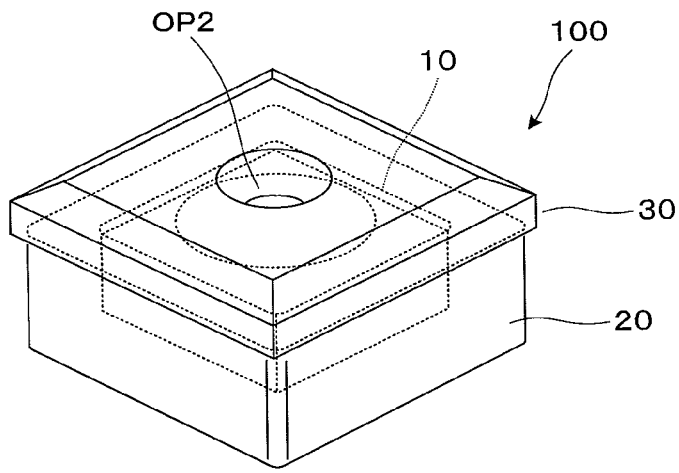
FIG. 2(B) is an external perspective view of the image pickup lens unit.

As illustrated in FIG. 1 and FIGS. 2(A) and 2(B), an image pickup lens unit 100 obtained by the manufacturing method of the present embodiment includes a lens 10 that is a laminating-type lens assembly or compound lens, a first holder member 20 that is a rectangular frame-like or box-like member, and a second holder member 30 that is a rectangular lid-shaped member. It should be noted that the first holder member 20 and the second holder member 30 are connected by welding in the boundary surface extending perpendicularly to an optical axis OA, and configure a holder 40 that is an integral component.

The lens 10, for example, is cut out through dicing from a lens wafer (wafer-shaped base material) in which several lenses are arranged, has a contour that is rectangular shaped in the plan view, and also has a rectangular prism-like side surface. The lens 10 includes a first lens element 11 at the object side, a second lens element 12 at the image side, and an stop 15 interposed between the two.

In the lens 10, the first lens element 11 includes a lens main body 11a having a circular contour and provided in the center around the optical axis OA, and a frame portion 11b having a rectangular contour and extending in the vicinity or surrounding of the lens main body 11a. The lens main body 11a, for example, is an aspherical lens portion having a pair of optical surfaces 11d and 11e. The first optical surface 11d and a first frame surface 10a described later, which are on the upper side, constitute a first surface of the lens 10. The first lens element 11, for example, is formed of a curable resin having reflow heat resistance, but does not have to be entirely formed of a resin. The first lens element 11a may have a structure in which a glass plate is sandwiched by molded resin bodies. In addition, the entire first lens element 11 can also be formed of a glass. Curable resins include heat-curable or thermo-settable resins, light-curable resins, radiation-curable resins, or the like.

The second lens element 12 also includes a lens main body 12a having a circular contour and provided in the center around the optical axis OA, and a frame portion 12b having a rectangular contour and extending in the surrounding or vicinity of the lens main body 12a. The lens main body 12a, for example, is an aspherical lens portion having a pair of optical surfaces 12d and 12e. The second optical surface 12e and a second frame surface 10b described later, which are on the lower side, constitute a second surface of the lens 10. The second lens element 12, for example, is formed of a curable resin, but can also have a structure in which a glass plate is sandwiched by molded resin bodies, or the entire lens element is formed from glass. The outer peripheral side of the frame portion 11b of the first lens element 11 and the outer peripheral side of the frame portion 12b of the second lens element 12, for example, are integrated by adhering and fixing with an adhesive, and the lens 10 including both lens elements 11 and 12 can be handled as a single lens. Furthermore, the lens 10 can also be formed by adhering the first lens element 11 and the second lens element 12 by inserting a spacer in between. The lens 10 can also have a configuration in which a resin-made first lens element 11 is formed on one surface of a glass substrate, and a resin-made second lens element 12 is formed on the other surface of the glass substrate.

The stop 15 is a ring-shaped member having an opening OP3 in the center, and is inserted and fixed between the inner peripheral side of the frame portion 11b of the first lens element 11, and the inner peripheral side of the frame portion 12b of the second lens element 12. The stop 15, for example, is formed from a metallic plate or resin film having a light blocking effect, or an opaque photoresist material for example black-colored one. The stop 15 is also desired to be formed from a material having reflow heat resistance.

The first holder member 20 is formed from a thermoplastic resin having reflow heat resistance (for example, Liquid Crystal Polymer (LCP), Polyphthalamide (PPA), and so forth), includes a side wall part 21 having a rectangular pipe contour, and a bottom part 22 having a rectangular plate-shaped contour, and forms an overall depression RE to enable inserting and holding the lens 10. The side wall part 21 restricts or limits the movement of the lens 10 in the lateral or horizontal direction perpendicular to the optical axis OA by facing four side surfaces 10c of the lens 10, and the bottom part 22 restricts the movement of the lens 10 in the lower direction along the optical axis OA by facing the lower second frame surface 10b of the lens 10. As illustrated in FIG. 2(A), four stepped protrusions 21d configured to be in contact with the side surface 10c of the lens 10 and guide the lens 10 towards the inside are formed on the inner side of the side wall part 21 at the time of inserting the lens 10 in the depression of the first holder member 20. A circular opening OP1 is formed in the center of the bottom part 22, and an annular edge portion 22e surrounding the opening OP1 is configured to function as a stop. Because a part of the first holder member 20 also functions as a stop, with the specification that a stop is to be arranged on the lens surface, a stop separate from the holder 40 need not be formed, which enables a reduction in the number of components.

In the present embodiment, a slight gap is provided between the side surface 10c of the lens 10 arranged in the depression RE and the stepped protrusion 21d of the first holder member 20. Also, as illustrated in the partially enlarged view of FIG. 1, an inclined surface 12f formed as a bending part or a contact surface is provided between the second optical surface 12e and the second frame surface 10b of the lens 10. The annular edge portion 22e provided in the bottom part 22 of the first holder member 20 includes an inclined surface part 22f configured to face the inclined surface 12f of the lens 10, a curved surface part 22g having a shape along the second optical surface 12e by leaving a small gap towards the optical surface 12e of the lens 10, and a wall surface part 22h formed to be separated from the second optical surface 12e of the lens 10. The edge portion 22e forms a positioning portion for precisely positioning the lens 10, which can be moved slightly in the horizontal direction, in a direction perpendicular to the optical axis OA. That is, the edge portion 22e has the role of precisely aligning the optical axis OA of the first holder member 20 and the optical axis OA of the lens 10 by coming in contact with the outer peripheral inclined surface (inclined surface 12f) of the lens main body 12a in the second lens element 12, at the time of inserting the lens 10 in the first holder member 20. By having such a structure, direct alignment of the lens 10 and the edge portion 22e formed as an stop is possible in a precise manner. At this time, by reducing the pressure in the withdrawal space SS at the side of the optical surface 12e of the lens 10 via the pressure reducing path (not shown in the figure) provided in a mold portion 56 or the like described later, the aligned or positioned lens 10 can be sucked in from the side of the mold, and the movement of the lens 10 can be prevented.

The positioning of the lens 10 with respect to the first holder member 20 can also be achieved by forming a contact surface facing the inclined part (bending part) 12f, which is inside the surface of the lens main body 12a constituting the optical surface 12e of the second lens element 12 and is in the region outside the effective region of the optical surface, in the edge portion 22e of the first holder member 20, and then bringing the contact surface in contact with the inclined part (inclined surface) 12f of the lens 10. In such a case, a bending part, such as an inclined surface for positioning, need not be provided separately in the surface where the optical surface 12e of the second lens element 12 is formed.

The above first holder member 20 is formed by injection molding of a resin. The details will be described later.

The second holder member 30 is formed by a thermoplastic resin (for example, LCP and PPA, and so forth) having reflow heat resistance, and has a rectangular plate-shaped contour. The second holder member 30 restricts the movement of the lens 10 in the upper direction along the optical axis OA by facing the upper first frame surface 10a of the lens 10. A circular opening OP2 is formed in the center of the second holder member 30, and an annular edge portion 30e enclosing the opening OP2 functions as a type of an stop by being arranged so as to shield the surrounding of the optical surface of the lens. The above second holder member 30 is described in detail later, but is formed by injection molding of a resin performed after molding the first holder member 20, and is directly joined with the first holder member 20 through welding of the resin. That is, an upper end surface 20a of the first holder member 20 and an outer rectangular surface 30b of the second holder member 30 are welded strongly with each other through the heat during the injection molding of the first holder member 20, and are joined directly rather than using an adhesive. It should be noted that when the material of both the first holder member 20 and the second holder member 30 is LCP, there are very few materials that serve as good adhesives, and therefore, as in the case of the present embodiment, reliable joining of both the holder members 20 and 30 can be achieved by using welding.

An inner surface 20g of the bottom part 22 of the first holder member 20 is the contact surface, and is in contact with the second frame surface 10b (particularly, the surrounding of the second optical surface 12e) of the lens 10. The lens 10 is stored inside the first holder member 20 and is only slightly biased towards the lower side, because of which the above inner surface 20g and the second frame surface 10b are only simply in contact, and are not adhering to each other. On the other hand, an inner surface 30h of the second holder member 30 is either adhered or welded with the first frame surface 10a of the lens 10. At the time of injection molding of the second holder member 30, the first frame surface 10a of the lens 10 is in contact with a fluid resin, and therefore, if the surface of the lens 10 is made of a resin, the surface of the first frame surface 10a of the lens 10 softens due to the heat during injection molding, is welded strongly with the inner surface 30h of the second holder member 30, and thus joined directly without the use of an adhesive. Furthermore, when the surface of the lens 10 is made of glass, the lens 10 and the resin are not welded during the course of injection molding of the resin, but because a liquid resin solidifies upon intimate contact with the first frame surface 10a of the lens 10, the inner surface 30h of the second holder member 30 adheres to the lens, and the holder 40 can thus stick firmly to the lens 10. By having such a configuration, the positioning of the lens 10 can be performed freely in the initial stage, and after the incorporation of the lens 10, the inner surface 30h of the second holder member 30 and the first frame surface 10a of the lens 10 are either welded or adhered, because of which all of the members, that is, the lens 10, the first holder member 20, and the second holder member are connected and a stable positioning accuracy is maintained.

In the image pickup lens unit 100 having such a configuration, the first holder member 20 and the second holder member 30 are in intimate contact with the periphery of the lens (particularly, the frame portions 11b and 12b), without any gap, because of which the occurrence of a ghost and flare due to the entry of light from the side surface of the lens can be prevented. Furthermore, because there is almost no unnecessary gap on the side surface of the lens, and there is no need to secure a resin flow path for joining both holder members 20 and 30, the holder 40 can be reduced in thickness, resulting in a smaller size of the image pickup lens unit 100, which makes it easier to satisfy the appearance specifications required when it is envisaged that the image pickup lens unit is installed on a final product such as an image pickup device. In addition, because there is almost no unnecessary gap on the side surface of the lens, the deterioration in the dimension accuracy as a result of the deformation during mold release can also be prevented.

Next, with reference to the production procedure illustrated in FIG. 3, for example, the method for manufacturing the image pickup lens unit 100 illustrated in FIG. 1, for example, will be described.

Figure 3:
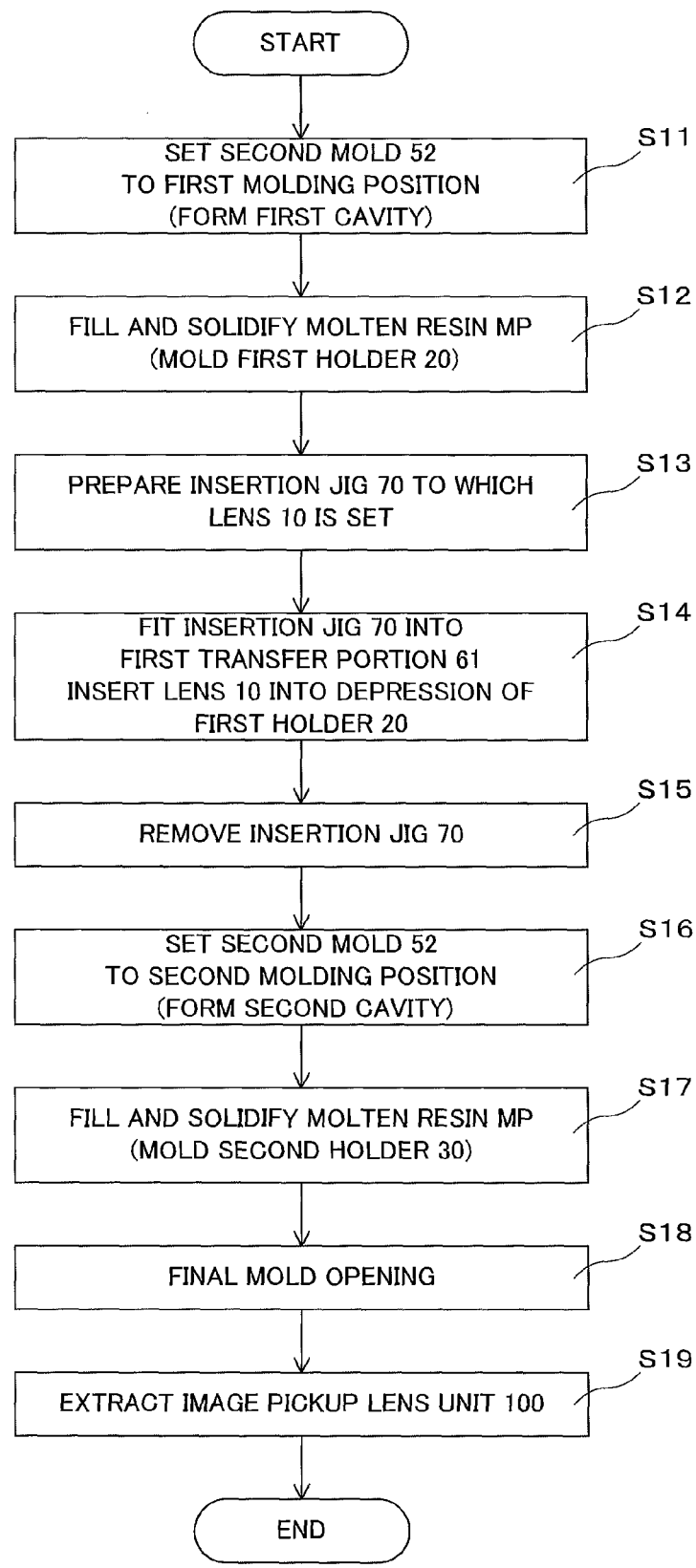
FIG. 3 is a flowchart for explaining the procedure of manufacturing the image pickup lens unit illustrated in FIG. 1.

First of all, as illustrated in FIG. 4(A), by appropriately operating a mold device 50 having a first mold 51 at the fixed side and a second mold 52 at the movable side, the second mold 52 can be moved towards a first molding position to perform mold clamping, because of which a first cavity CA1 is formed as the molding space for the first holder member 20 between the first mold 51 and the second mold 52 (step S11 in FIG. 3). At this time, a first molding portion 61 is provided in the first mold 51 to project from a parting surface 51a, a second molding portion 62 is provided in the second mold 52 to scoop in from a parting surface 52a, and by fitting both the molding portions 61 and 62 into each other, the first cavity CA1 is formed as the space between both molding portions 61 and 62. Transfer surfaces 61a and 61b for molding an outer peripheral side surface 20i and a back surface 20j, respectively, of the first holder member 20 illustrated in FIG. 1 are formed in the first molding portion 61 at the side of the first mold 51. Furthermore, transfer surfaces 62a and 62b for molding an inner surface 20c including the stepped protrusion 21d of the first holder member 20 and the inner surface 20g at the bottom side, respectively, are formed in the second molding portion 62 at the side of the second mold 52.

The first mold 51 includes a main body 53a having the parting surface 51a, and a mounting plate 53b configured to support the main body 53a from the back, and the second mold 52 includes a main body 54a having the parting surface 52a, and a mounting plate 54b configured to support the main body 54a from the back. The rectangular prism-like mold portion 56, for example, is embedded in the center of the first molding portion 61, in the first mold 51. The mold portion 56 is embedded so as to be able to slide in a hole 53d formed in the main body 53a of the first mold 51, and the back surface of the mold portion 56 is connected to a rod 53e for driving. The mold portion 56 defines a transfer surface 56a in the center of the transfer surface 61a at the bottom of the first molding portion 61. Because the mold portion 56 advances and retracts in the axial direction by operating the rod 53e, when the mold portion 56 is retracted, the transfer surface 56a can be displaced towards the lower side from the standard position illustrated in the figure, that is, towards the side of the mounting plate 53b, and when the mold portion 56 is advanced, the transfer surface 56a can be displaced towards the upper side from the standard position illustrated in the figure, that is, towards the side of the second mold 52.

A fitting member 61g installed in a standing manner and provided with a slight taper is formed in the outer periphery of the first molding portion 61, and the outer peripheral surface of the fitting member forms a fitting surface 61f. Furthermore, a fitting surface 62f provided with a slight taper is formed even in the inner periphery of the second molding portion 62, and therefore, a precise alignment in the horizontal direction is achieved between both the molding portions 61 and only by fitting both the molding portions 61 and 62. Furthermore, when both the molding portions 61 and 62 are fitted, an upper surface 61p of the outer periphery of the fitting member 61g of the first molding portion 61 and a bottom surface 62p of the outer periphery of the second molding portion 62 are arranged in a close position or in an intimate contact position, and the surfaces 61p and 62p function as parting lines with regard to molding of the first holder member 20. In addition, for example, a taper lock pin can also be provided in the first mold 51 at the fixed side and the second mold 52 at the movable side, and in such a case, a more accurate and precise alignment can be achieved. A resin filling port, not illustrated in the figure, is provided in at least one of the two molding portions 61 and 62. Furthermore, a heating mechanism for heating the molds 51 and 52, and a platen for pressing the molds 51 and 52 from the back are also provided, but they have been omitted from the figure to simplify the understanding.

Next, as illustrated in FIG. 4(B), in a state where the molding portion 56 is kept at the standard position for molding, the first holder member 20 is molded (first molding step; step S12 in FIG. 3) by filling a fluid resin MP, which must constitute the material of the first holder member 20, in the first cavity CA1, and at the same time, solidifying the fluid resin by temperature adjustment.

Figure 5:
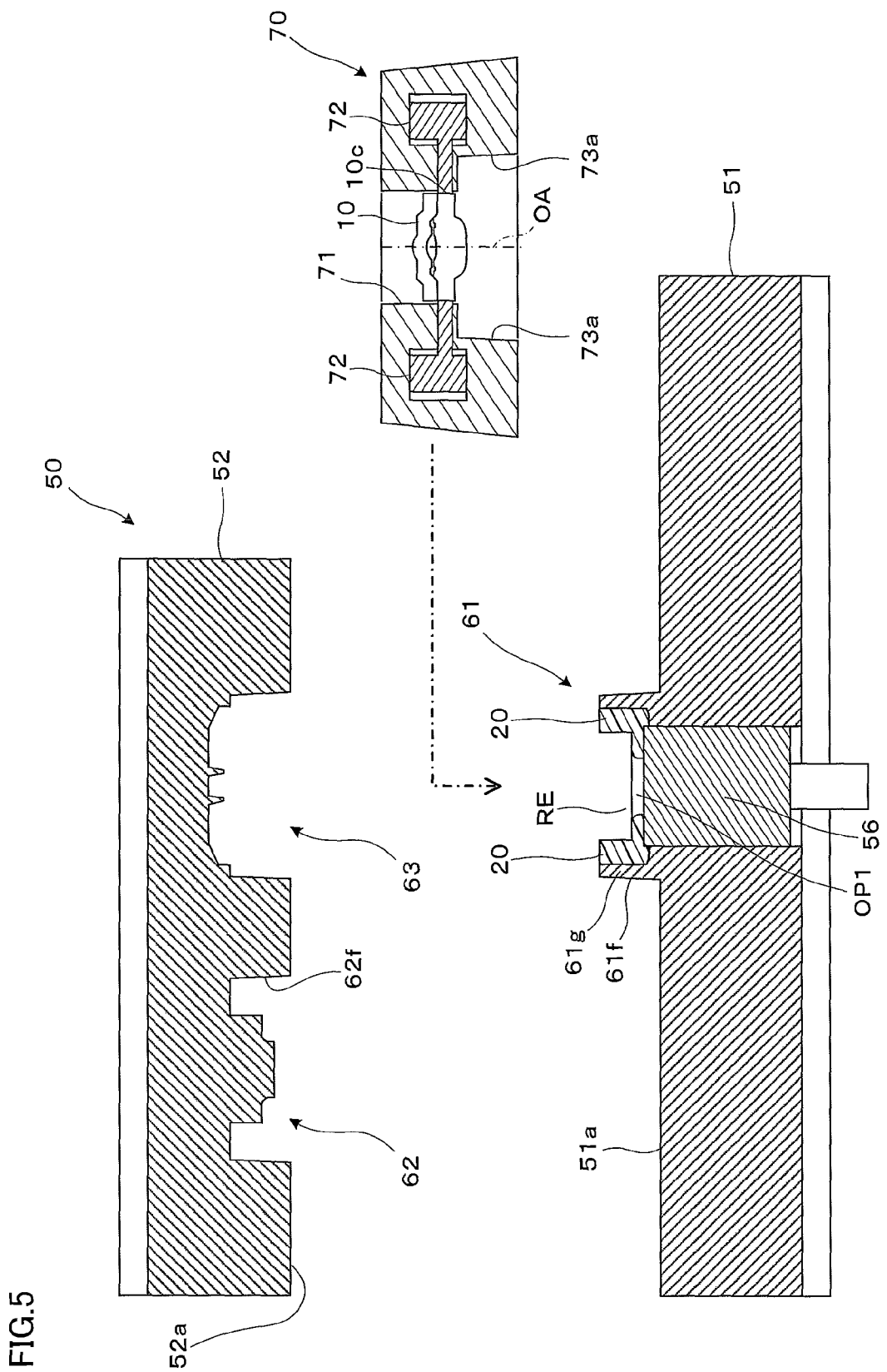
FIG. 5 is a cross-sectional view for explaining an insertion jig that holds a lens.

Next, as illustrated in FIG. 5, the second mold 52 is set to a withdrawal state by mold opening configured to separate the second mold 52 from the first mold 51. At this time, the first holder member 20 is held while being embedded in the first molding portion 61 in the first mold 51. In such a state, an insertion jig or insert tool 70 configured to hold the lens 10 is moved at an upper position of the first holder member 20 held in the first molding portion 61 (step S13 in FIG. 3).

The insertion jig 70 is an annular member configured to temporarily hold the lens 10 in a central through hole 71. The insertion jig 70 is driven remotely by a control drive device (not illustrated in the figure), and transports the lens 10. Furthermore, the insertion jig 70 includes a chuck member 72 having a plurality of pressing members or locking members configured to advance and retract towards the side surface 10c of the lens 10, and by pressing the side surface 10c of the lens 10 from a plurality of directions, the lens 10 can be supported at the center of the through hole 71 in the setup state illustrated in the figure, and in the release state described later, the lens 10 inside the through hole 71 can be moved in the direction of the optical axis OA of the lens 10. It should be noted that a mechanism for holding the lens 10 such that the lens 10 does not fall due to the air flow can also be adopted in the insertion jig 70. Furthermore, in the lower part of the insertion jig 70, an annular fitting surface 73a having a taper for fitting with the first mold 51 is provided.

Figure 6:
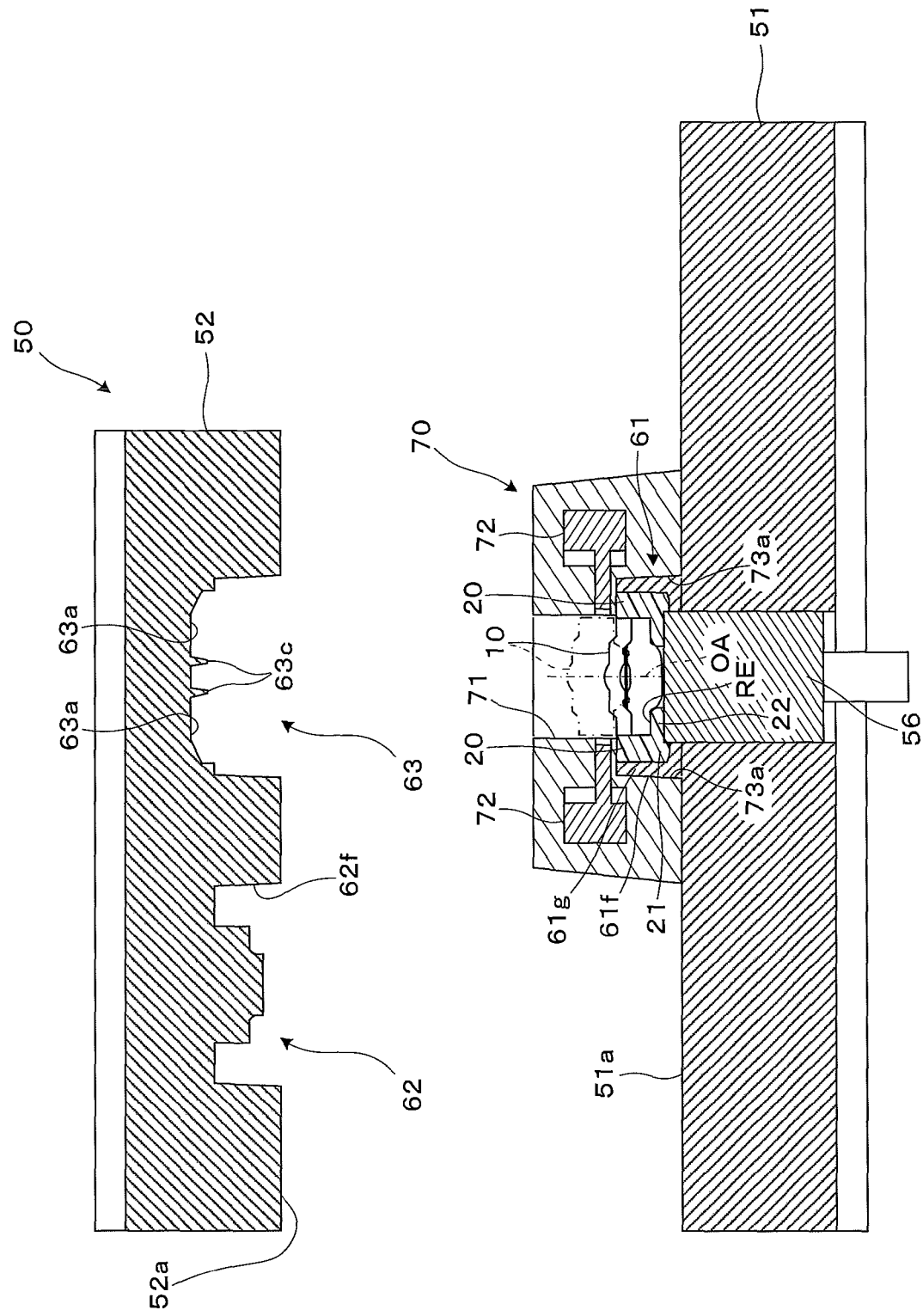
FIG. 6 is a cross-sectional view for explaining the setting of the lens in the first holder member by the insertion jig.

Next, as illustrated in FIG. 6, while holding the second mold 52 in a withdrawal state, the insertion jig 70 is brought down and the fitting surface 73a on the inner side of the lower part of the insertion jig 70 is fitted with the fitting surface 61f of the fitting member 61g of the first molding portion 61. Thus, the optical axis OA of the lens 10 held in the insertion jig 70 and the optical axis OA of the first holder member 20 embedded in the first molding portion 61 of the first mold 51 can be almost aligned, and the lens 10 can be accurately incorporated in the first holder member 20. In such a state, if the insertion jig 70 is switched to the release state, the lens 10 whose gripping is released by the chuck member 72 falls and is inserted in the depression RE of the first holder member 20 (insertion step; step S14 in FIG. 3). At this time, the lens 10 moves towards the lower side by being guided by the stepped protrusion 21d (see FIG. 1) provided in the side wall part 21 of the first holder member 20, and is supported on the bottom part 22, and at the same time, the lens is positioned in the horizontal direction by the edge portion 22e (see FIG. 1) provided in the bottom part 22.

Figure 7:
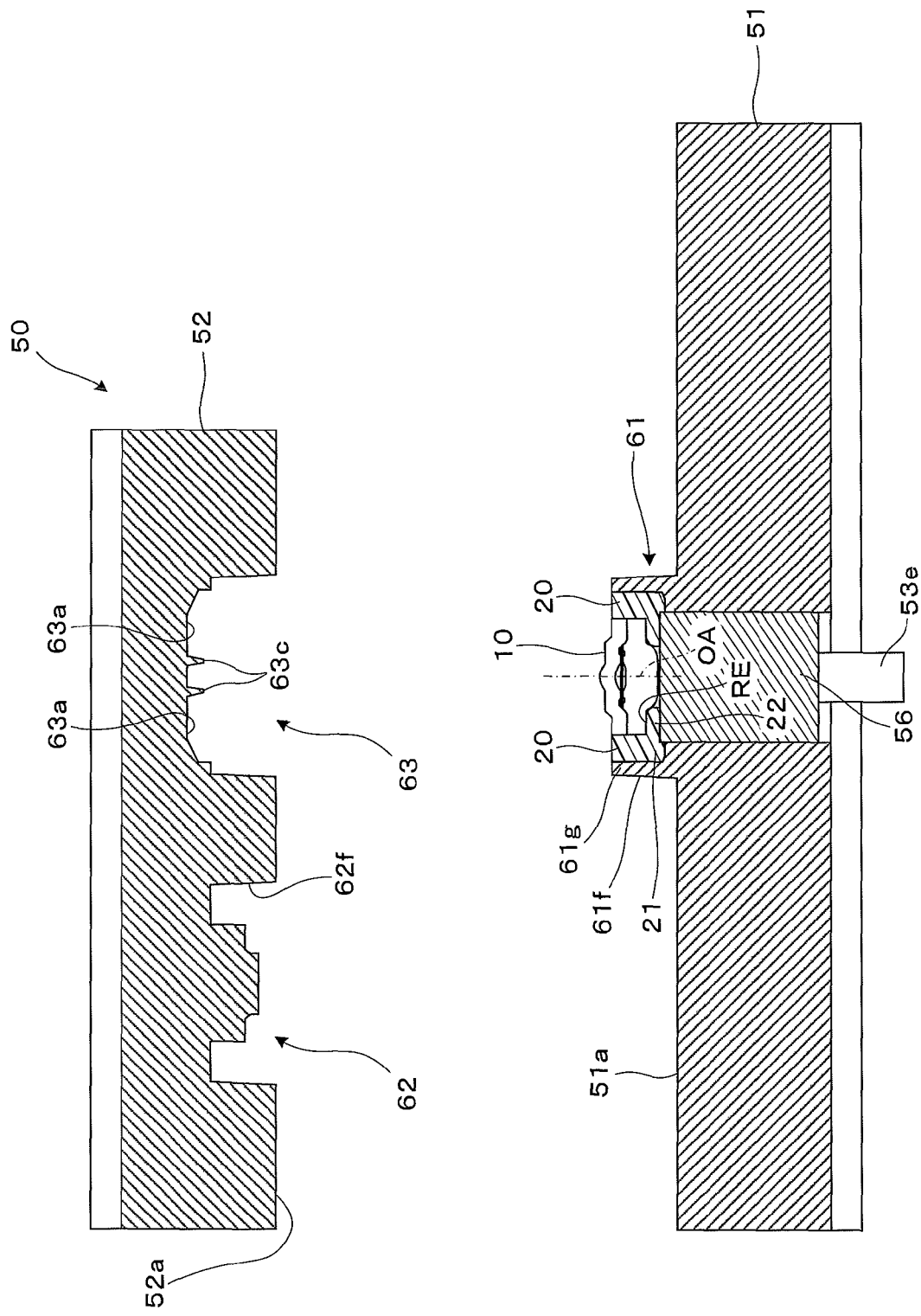
FIG. 7 is a cross-sectional view for explaining the removal of the insertion jig.

Following this, as illustrated in FIG. 7, the insertion jig 70 is removed from the first mold 51 (step S15 in FIG. 3).

Figure 8:
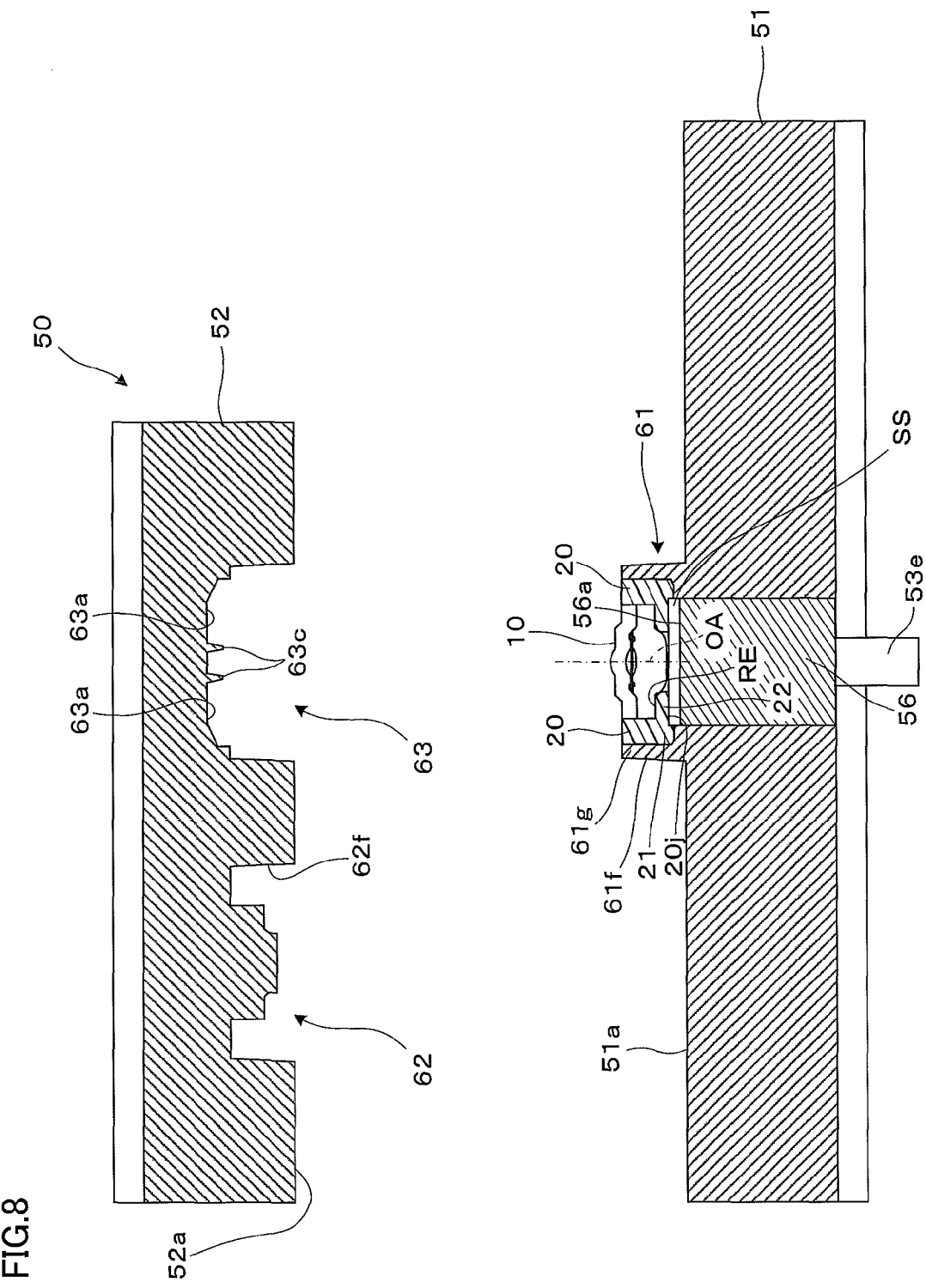
FIG. 8 is a diagram for explaining the operation of the mold portion of a first mold.

When the insertion jig 70 is removed from the first mold 51, the mold portion 56 is moved to the retracting position from the standard position for molding by operating the rod 53e, as illustrated in FIG. 8. As illustrated in the figure, if the mold portion 56 is arranged in the retracting position, a withdrawal space SS is formed between the back surface 20j of the first holder member 20 formed in step S12 in FIG. 3, and the transfer surface 56a at the upper end of the mold portion 56. By providing the withdrawal space SS, the slight distortion of the bottom part 22 of the first holder member 20 becomes permissible. In more details, because the first holder member 20 is formed from a thermoplastic resin, for example, and undergoes slight elastic deformation, when the mold portion 56, which is a support from the lower side, is retracted, the bottom part 22 (particularly, the edge portion 22e) can be displaced vertically upon receiving a vertical stress along the optical axis OA. As a result, when the lens 10 that is supported by the edge portion 22e, for example, of the bottom part 22 of the first holder member 20 is also affected by the stress directed towards the lower side along the optical axis OA, the lens displaces slightly towards the lower side, and when the stress is no longer received, the lens returns to the original position. That is, by arranging the mold portion 56 at the retracting position, the bottom part 22 of the first holder member 20 functions as a cushion, and when an outer force acts on the lens 10, the action and impact therefrom are weakened.

Next, as illustrated in FIG. 9(A), by moving the second mold 52 to the second molding position and performing mold clamping, a second cavity CA2 is formed as the molding space for the second holder member 30 between the first mold 51 and the second mold 52 (step S16 in FIG. 3). In the second mold 52, a third molding portion 63 is provided facing the first molding portion 61 so as to scoop in from the parting surface 52a, and both the molding portions 61 and 63 are fitted. The inner periphery of the third molding portion 63 also forms a fitting surface 63f provided with a slight taper, and therefore, only by fitting the third molding portion 63 and the first molding portion 61, the fitting surface 63f of the third molding portion 63 is brought in contact with the fitting surface 61f of the fitting member 61g of the first molding portion 61, which enables an accurate positioning of the third molding portion 63 and the first molding portion 61. As a result, when the image pickup lens unit 100 is completed in the final stage, the optical axis OA of the second holder member 30, the optical axis OA of the first holder member 20, and the optical axis OA of the lens 10 can be aligned. In the third molding portion 63 at the side of the second mold 52, a transfer surface 63a for molding an upper surface 30u (see FIG. 1), for example, of the second holder member 30 illustrated in FIG. 1 is formed. Furthermore, in the third molding portion 63, a fixing member 63c, which is a pressing member for fixing the lens 10 by coming in contact with the lens 10 so as to enclose the outer region of the optical surface 11d of the lens 10 is provided. The fixing member (pressing member) 63c also plays the role of obstructing the flow of the fluid resin MP (see FIG. 9(B)) towards a space SP adjoining the optical surface 11d of the lens 10. At the time of forming the second cavity CA2 by mold clamping, the fixing member 63c comes in contact with the inner-most peripheral portion of the frame portion 11b of the lens 10 and gently pushes the lens 10 towards the lower side so that the lens 10 is stabilized inside the first holder member 20 and the generation of a play is prevented. The bottom part 22 of the first holder member 20 is faced to the withdrawal space SS, and the bottom part 22 functions as a cushion, because of which when a force directed towards the lower side is applied to the lens 10, the lens 10 can be brought down only by a slight width. That is, when the lens 10 is fixed by mold clamping of both the molds 51 and 52, the impact on the lens 10 can certainly be controlled by the elasticity of the bottom part 22 of the first holder member 20, and thereby, the breakage or deformation of the lens 10 can be certainly reduced.

It should be noted that as the position of pressing the fixing member 63c towards the lens 10 is brought close to the optical surface 11d, and the thickness of the fixing member 63c is reduced, the opening of the second holder member 30 obtained by molding comes close to the optical surface, and thus the light blocking function as the stop can be enhanced. As long as there are no problems concerning the optical performance, a contact surface facing the inclined part which is inside the surface of the lens main body 11a constituting the optical surface 11d of the first lens element 11 and is in the region outside the effective region, may be formed in the fixing member (pressing member) 63c, and the lens 10 may be fixed by bringing the contact surface in contact with the inclined part.

Because the fitting surface 63f provided with a slight taper, is formed in the inner periphery of the third molding portion 63, corresponding to the fitting surface 61f of the fitting member 61g of the first molding portion 61, a precise alignment is achieved in the horizontal direction between both the molding portions 62 and 63 only by fitting the third molding portion 63 in the first molding portion 61. Furthermore, when both the molding portions 62 and 63 are fitted, the upper surface 61p of the outer periphery of the first molding portion 61 and the bottom surface 63p of the outer periphery of the third molding portion 63 are arranged in a close position or in an intimate contact position, and the surfaces 61p and 63p function as parting lines with regard to molding of the second holder member 30. Thus, as described above, the third molding portion 63 can be aligned accurately with respect to the first holder member 20.

Next, as illustrated in FIG. 9(B), the second holder member 30 is molded (second molding step; step S17 in FIG. 3) by filling the fluid resin MP, which constitutes the material of the second holder member 30, in the second cavity CA2, and at the same time, solidifying the fluid resin by temperature adjustment. Thus, the image pickup lens unit 100 fixed by inserting the lens 10 between the first holder member 20 and the second holder member 30 is completed. At this time, by preventing the flow of the fluid resin MP in the space SP, the fixing member (pressing member) 63c provided in the third molding portion 63 possesses the role of forming the opening OP2 in the second holder member 30.

Next, as illustrated in FIG. 10(A), the second mold 52 is set to a withdrawal state by mold opening configured to separate the second mold 52 from the first mold 51 (step S18 in FIG. 3), and as illustrated in FIG. 10(B), by using an ejector pin (not illustrated in the figure) or the like provided in the mold portion 56 or the first mold 51 to project out and separate the image pickup lens unit 100, the image pickup lens unit 100 can be extracted as a finished product from the first mold 51 (step S19 in FIG. 3).

According to the image pickup lens unit 100 of the above first embodiment, in the second molding step, by performing additional molding with respect to the first holder member 20 in which the lens 10 has been inserted, the separation of the lens 10 can be prevented, and at the same time, the second holder member 30 welded to the first holder member 20 can be molded. Therefore, the molding of the second holder member 30 and the process of joining the second holder member with the first holder member 20 can certainly be performed collectively, which can prevent an increase in the number of components for assembling the holder, for example. Thus, the assembly system of the image pickup lens unit 100 can be prevented from becoming a large-scale system. Furthermore, the second holder member 30 is molded in the state where the lens 10 is inserted in the first holder member 20, and therefore, it is possible to prevent the deterioration in the dimensional accuracy caused due to a large positioning shape in the first holder member 20, for example, being left behind. In addition, because the lens 10 is positioned by the first holder member 20 at the time of inserting the lens 10 in the first holder member 20, there is no need to set up an image recognition device or provide a positioning mechanism in the mold device 50, which enables improving the accuracy of the device for manufacturing the image pickup lens unit 100 in an easy manner. It should be noted that because an stop (edge portion 22e) is formed beforehand in the bottom part 22 of the first holder member 20, a separately formed stop need not be inserted in close proximity to the first holder member 20 at the time of assembling the image pickup lens unit 100, which enables the production process to be simplified. Additionally, according to the image pickup lens unit 100 of the first embodiment, when the lens 10 is fixed from the side of the third molding portion 63 of the second mold 52, the lens 10 and the third molding portion 63 are brought in contact by an elastic biasing force, because of which the impact on the lens 10 is reduced thus enabling more reduction in breakage, deformation and so forth of the lens 10.

In the above description, the fitting surfaces 61f, 62f, and 63f provided in the first molding portion 61, the second molding portion 62, and the third molding portion 63, were used for achieving the alignment between each of the molding portions, however, apart from the molding portions 61, 62, and 63, the same alignment can also be achieved with a taper pin, for example, provided in the molds 51 and 52.

Furthermore, in the above description, a lens assembly or compound lens in which the lens 10 was joined to form an integrated lens was used. In such a case, the step of insertion of the lens 10 in the mold and then the positioning of the lens can be performed easily, but the first lens element 11, the second lens element 12, and the stop 15 can even be separated. In this way, when the plurality of lens elements and the stop are to be separated, the second embodiment described below, that is, a form in which the side surface 10c of the lens 10 is brought in contact with the stepped protrusion 21d of the first holder member 20 to perform positioning of the lens 10 and the first holder member 20, can also be adopted. In such a case, by repeating the steps S13 through S15 of FIG. 3 a plurality of times, the first lens element 11 and the second lens element 12, for example, are inserted sequentially in the depression RE of the first holder member 20 by the insertion jig 70, and are positioned in the first holder member 20 by using the inner wall surface of the first holder member 20. As in the present embodiment, when a slight gap is provided between the side surface 10c of the lens 10 and the stepped protrusion 21d of the first holder member 20, and the edge portion 22e is made to perform the role of precisely aligning the optical axis OA of the first holder member 20 and the optical axis OA of the lens 10, a depression and a projection, for example, may be provided beforehand between the first lens element 11, the second lens element 12, and the stop 15 to achieve positioning thereof. Thus, after installing and positioning the second lens element 12 on the first holder member 20 by executing steps S13 through S15 of FIG. 3, the stop 15 followed by the first lens element 11 is stacked, and positioning is performed by the above depression and projection, for example. Finally, step S16 of FIG. 3 and the steps thereafter may be executed.

In the above description, the first holder member 20 and the second holder member 30 were reflow heat-resistant materials, however, the holder members 20 and 30 need not be formed from the same material, but by using fluid resins MP for forming both the holder members 20 and 30 having different solidification temperatures, the welding state of both the holder members 20 and 30 can be adjusted.

Second Embodiment

Next, a method for manufacturing an image pickup lens unit according to a second embodiment will be described. It should be noted that the method for manufacturing the image pickup lens unit according to the second embodiment is achieved by changing some parts of the method for manufacturing the image pickup lens unit 100 according to the first embodiment, and the parts that are particularly not described are those that are the same as the first embodiment.

In the present embodiment, rather than providing a slight gap between the side surfaces 10c of the lens 10 illustrated in FIG. 1 and the stepped protrusion 21d (or the inner surface 20c) of the first holder member 20, the outer periphery of the lens 10 is brought in contact with the stepped protrusion 21d of the first holder member 20 to perform positioning of the lens 10 and the first holder member 200. In such a case, the stepped protrusion 21d configuring the inner wall surface of the first holder member 20 plays the role of precisely aligning the optical axis OA of the first holder member 20 and the optical axis OA of the lens 10.

It should be noted that when positioning of the lens is performed by using the stepped protrusion 21d of the first holder member 20, it is important to process the transfer surface 62a of the second molding portion 62 of the second mold 51 with high accuracy.

Third Embodiment

Next, a method for manufacturing an image pickup lens unit according to a third embodiment will be described. It should be noted that the method for manufacturing the image pickup lens unit according to the third embodiment is achieved by changing some parts of the method for manufacturing the image pickup lens unit 100 according to the first embodiment, and the parts that are particularly not described are those that are the same as the first embodiment.

Figure 11A:
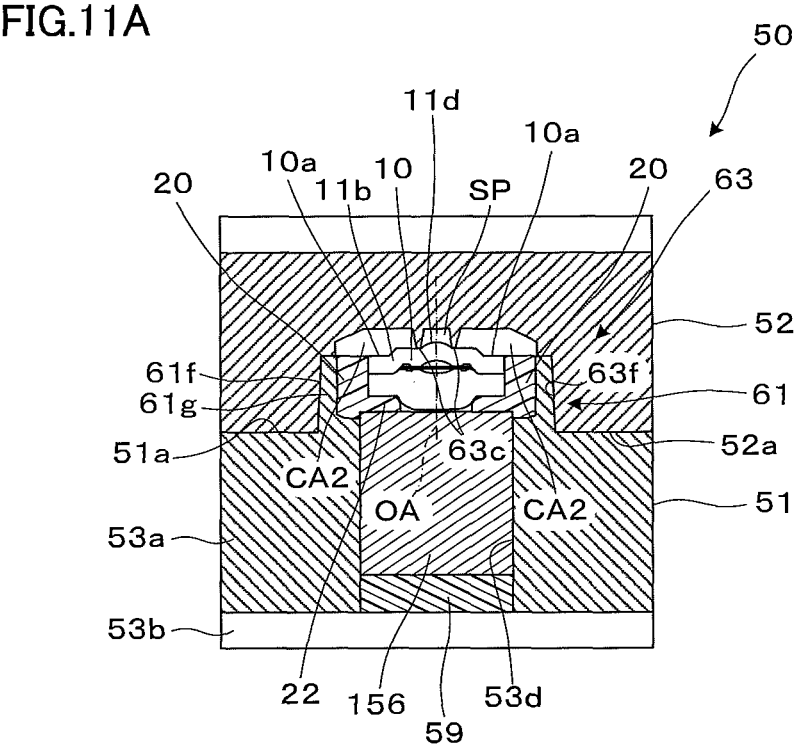
FIGS. 11(A) and (B) are diagrams for explaining a method for manufacturing an image pickup lens unit according to a third embodiment.
Figure 11B:
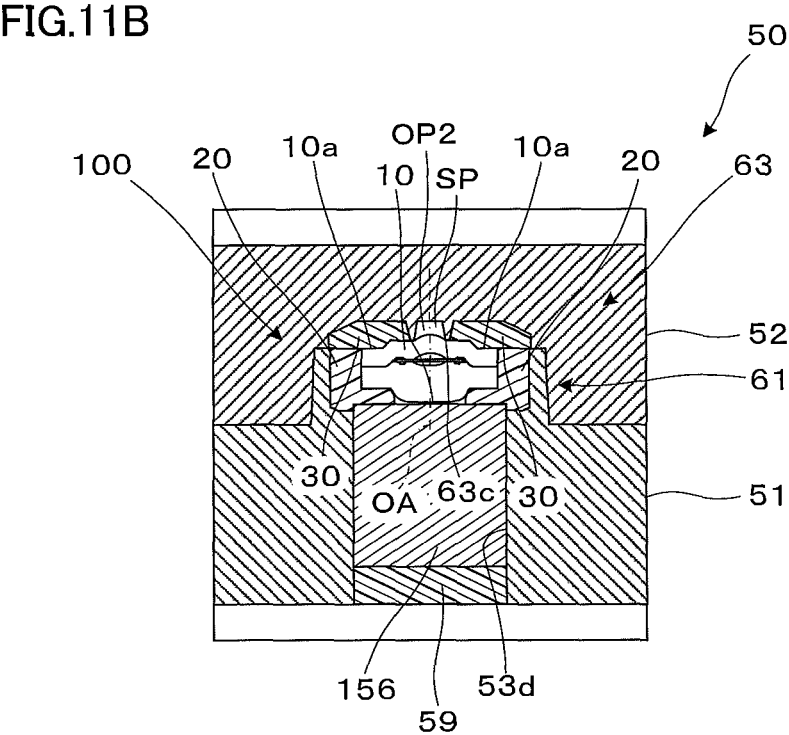

As illustrated in FIG. 11(A) and FIG. 11(B), in the first mold 51, a mold portion 156 is embedded in the center of the first molding portion 61. The mold portion 156 is inserted in the hole 53d formed in the main body 53a of the first mold 51 and extends vertically, and the back surface of the mold portion 156 is supported by the mounting plate 53b via an elastic body 59. Thus, when the mold portion 156 receives a compressing force from a direction perpendicular to the parting surface 51a, the mold portion is displaced elastically by a slight amount with respect to the main body 53a, and when the compressing force is no longer received, the mold portion returns to the original position. While the elastic body 59 can be formed from an elastic material including rubber or any other resin, the elastic body can also be formed from an elastic member such as a spring. It should be noted that each part of the first mold 51 and the second mold 52 other than the elastic body 59 is formed from a hard material such as a metal and ceramics (the same holds true for other embodiments as well).

As illustrated in FIG. 11(A), when mold clamping is performed for the first mold 51 and the second mold 52 to form the second cavity CA2 for the second holder member 30 in between the two molds, the fixing member 63c, which is a pressing member provided in the third molding portion 63 of the second mold 52, pushes the lens 10 held in the first holder member 20 towards the lower side. The mold portion 156 can be displaced elastically by a slight amount in a vertical direction perpendicular to the parting surface 52a, and as a result, the edge portion 22e provided in the bottom part 22 of the first holder member 20 and also the lens 10 supported by the edge portion can be displaced elastically by a slight amount in the vertical direction. That is, at the time of mold clamping, even if the fixing member (pressing member) 63c pushes the lens 10, the impact on the lens 10 can certainly be controlled by the elastic deformation of the bottom part 22 of the first holder member 20 or the edge portion 22e, and thereby, the breakage or deformation of the lens 10 can be reduced.

Fourth Embodiment

Next, a method for manufacturing an image pickup lens unit according to a fourth embodiment will be described. It should be noted that the method for manufacturing the image pickup lens unit according to the fourth embodiment is achieved by changing some parts of the method for manufacturing the image pickup lens unit 100 according to the first embodiment, and the parts that are particularly not described are those that are the same as the first embodiment.

Figure 12A:
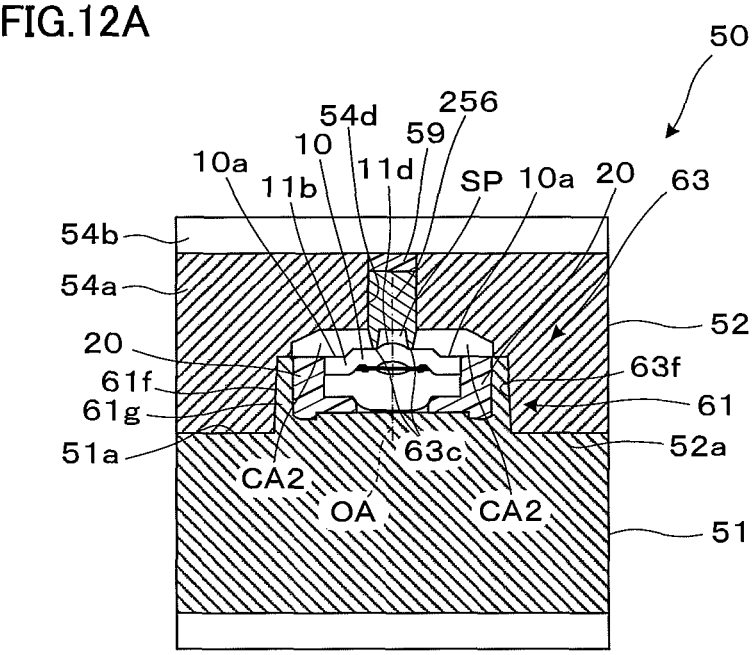
FIGS. 12(A) and (B) are diagrams for explaining a method for manufacturing an image pickup lens unit according to a fourth embodiment.
Figure 12B:
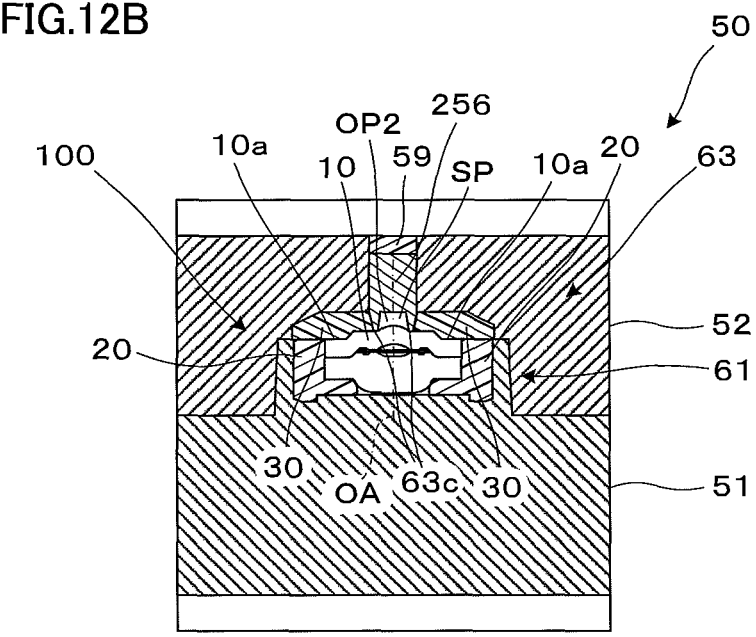

As illustrated in FIG. 12(A) and FIG. 12(B), in the second mold 52, a mold portion 256 in which a fixing member 63c, which is a pressing member, is formed at the lower end is embedded in the center of the third molding portion 63. The mold portion 256 is inserted in a hole 54d formed in the main body 54a of the second mold 52 and extends vertically, and the back surface of the mold portion 256 is supported by the mounting plate 54b via an elastic body 59. Thus, when the fixing member 63c and the mold portion 256 receive a compressing force from a direction perpendicular to the parting surface 52a, the fixing member and the mold portion is displaced elastically by a slight amount with respect to the main body 54a, and when the compressing force is no longer received, the fixing member and the mold portion return to the original position. While the elastic body 59 can be formed from an elastic material including rubber or any other resin, the elastic body can also be formed from an elastic member such as a spring.

As illustrated in FIG. 12(A), when mold clamping is performed for the first mold 51 and the second mold 52 to form the second cavity CA2 for the second holder member 30 in between the two molds, the fixing member (pressing member) 63c provided in the second molding portion 63 of the second mold 52 pushes the lens 10 held in the first holder member 20 towards the lower side. The fixing member 63c, that is, the mold portion 256 can be displaced elastically by a slight amount in a vertical direction perpendicular to the parting surface 52a, and therefore, the impact caused by the contact of the fixing member 63c is moderated, and a projection 63d of the fixing member 63c comes in intimate contact with the inner-most peripheral portion of the frame portion 11b in the lens 10. That is, the lens 10 is stabilized inside the cavity CA2 or the first holder member 20 without being damaged, and the generation of a play is prevented.

Fifth Embodiment

Next, a method for manufacturing an image pickup lens unit according to a fifth embodiment will be described. It should be noted that the method for manufacturing the image pickup lens unit according to the fifth embodiment is achieved by changing some parts of the method for manufacturing the image pickup lens unit 100 according to the first embodiment, and the parts that are particularly not described are those that are the same as the first embodiment.

Figure 13A:
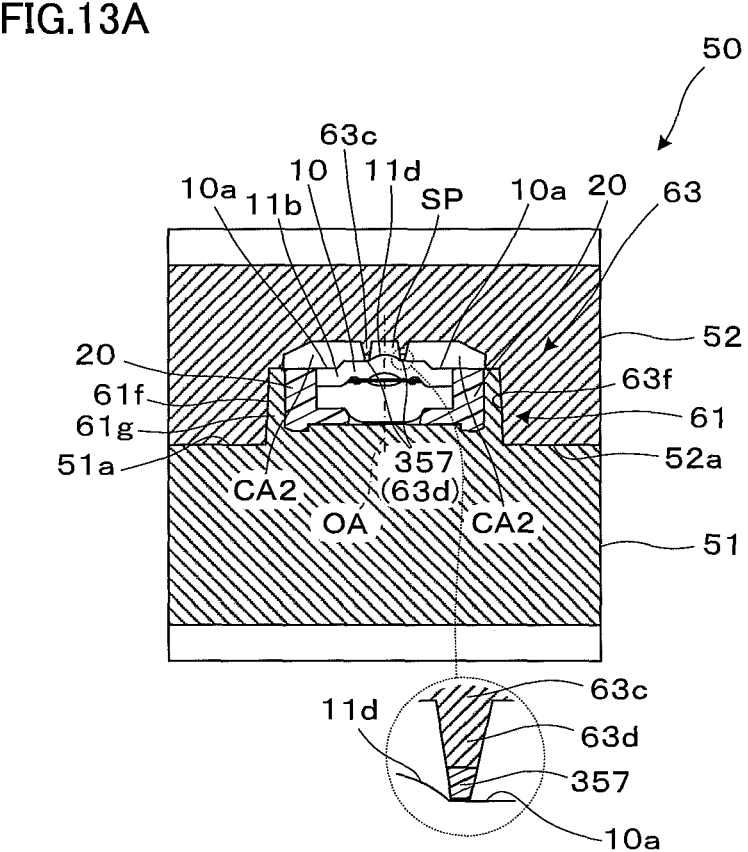
FIGS. 13(A) and (B) are diagrams for explaining a method for manufacturing an image pickup lens unit according to a fifth embodiment.
Figure 13B:
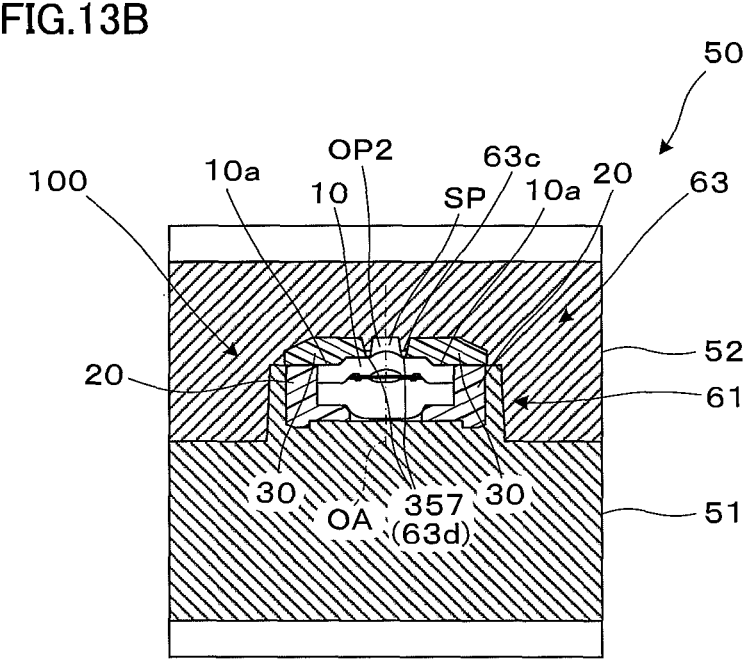

As illustrated in FIG. 13(A) and FIG. 13(B), in the second mold 52, the fixing member 63c, which is a pressing member provided in the third molding portion 63, includes the cylindrical projection 63d, and an elastic body 357 is mounted at the tip of the projection 63d. The elastic body 357 possesses not only elasticity, but also heat resistance and chemical durability such that the elastic body does not undergo deformation or a change in properties as a result of the heat of the fluid resin MP.

As illustrated in FIG. 13(A) and others, when mold clamping is performed for the first mold 51 and the second mold 52 to form the cavity CA2 for the second holder member 30 in between the two molds, the fixing member (pressing member) 63c provided in the third molding portion 63 of the second mold 52 pushes the lens 10 on the first holder member 20 towards the lower side. Because the elastic body 357 provided in the protrusion 63d of the fixing member 63c can be deformed by a slight amount, the impact caused by the contact of the fixing member 63c is moderated, and the projection 63d of the fixing member 63c comes in intimate contact with the inner-most peripheral portion of the frame portion 11b in the lens 10. That is, the lens 10 is stabilized inside the cavity CA2 or the first holder member 20 without being damaged, and the generation of a play is prevented.

Sixth Embodiment

Next, a method for manufacturing an image pickup lens unit according to a sixth embodiment will be described. It should be noted that the method for manufacturing the image pickup lens unit according to the sixth embodiment is achieved by changing some parts of the method for manufacturing the image pickup lens unit 100 according to the first embodiment, and particularly, the parts that are not described are those that are the same as the first embodiment.

Figure 14A:
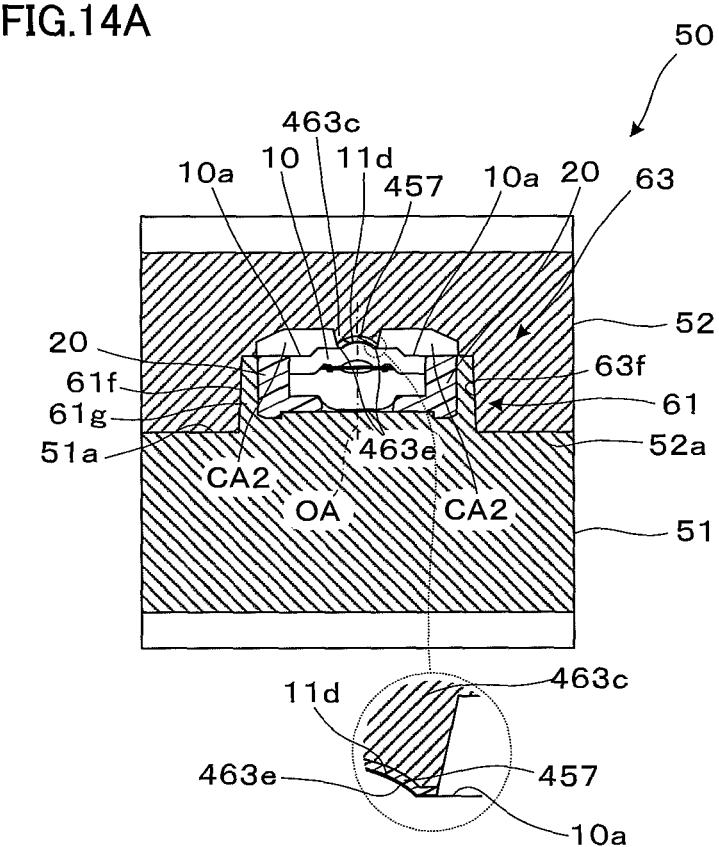
FIGS. 14(A) and (B) are diagrams for explaining a method for manufacturing an image pickup lens unit according to a sixth embodiment.
Figure 14B:
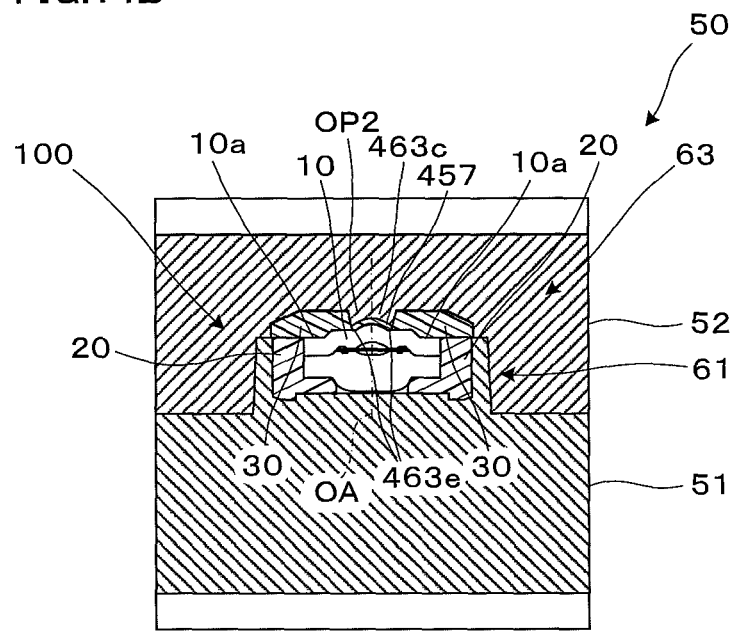

As illustrated in FIG. 14(A) and FIG. 14(B), in the second mold 52, a fixing member 463c, which is a pressing member provided in the third molding portion 63 is a columnar projection, and an end surface 463e, which is the contact surface, has the same or almost the same curvature as the optical surface 11d of the lens 10. In addition, the end surface 463e is formed from an elastic body layer 457 and is configured to be able to intimately contact with the optical surface 11d of the lens 10. If the optical surface 11d does not have a uniform curvature, or is aspherical, the end surface 463e is set to the same shape or almost the same shape as the optical surface 11d.

As illustrated in FIG. 14(A) and others, when mold clamping is performed for the first mold 51 and the second mold 52 to form the cavity CA2 for the second holder member 30 in between the two molds, the fixing member (pressing member) 463c provided in the third molding portion 63 of the second mold 52 pushes the lens 10 on the first holder member 20 towards the lower side. Because the elastic body layer 457 that forms the end surface 463e of the fixing member 463c can be deformed by a slight amount, the impact caused by the contact of the fixing member 463c is moderated, and the end surface 463e of the fixing member 463c comes in intimate contact with the optical surface 11d in the lens 10. That is, the lens 10 is stabilized inside the cavity CA2 or the first holder member 20 without being damaged, and the generation of a play is prevented.

In the present embodiment, the end surface 463e of the fixing member 463c and the optical surface 11d of the lens 10 are in intimate contact and the fluid resin MP is prevented from leaking out to the optical surface 11d. As a result, the opening OP2 can be formed in the second holder member 30.

Seventh Embodiment

Next, a method for manufacturing an image pickup lens unit according to a seventh embodiment will be described. It should be noted that the method for manufacturing the image pickup lens unit according to the seventh embodiment is achieved by changing some parts of the method for manufacturing the image pickup lens unit 100 according to the first embodiment, and the parts that are particularly not described are those that are the same as the first embodiment.

Figure 15A:
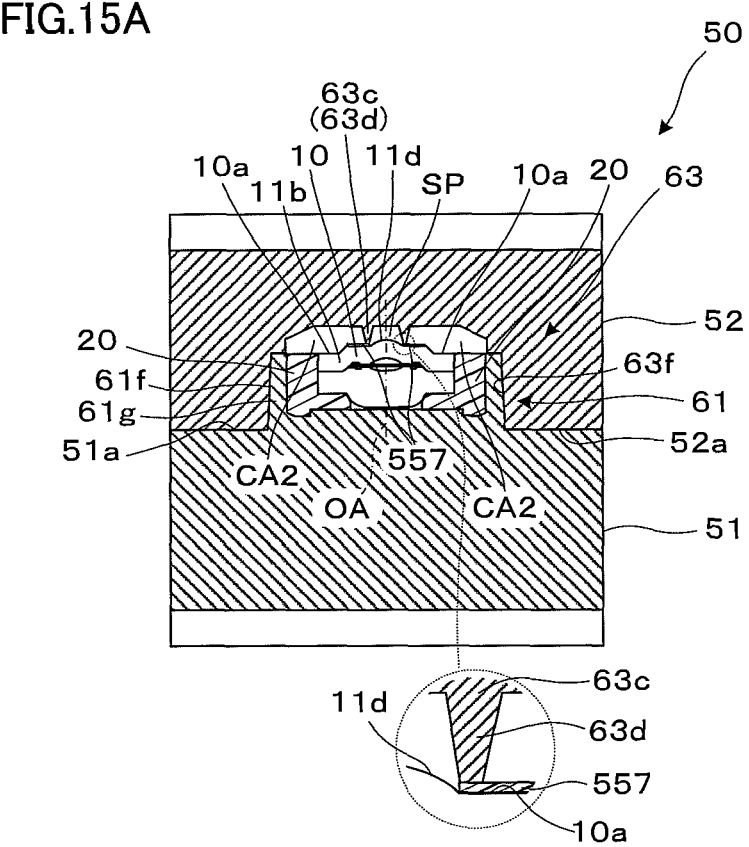
FIGS. 15(A) and (B) are diagrams for explaining a method for manufacturing an image pickup lens unit according to a seventh embodiment.
Figure 15B:
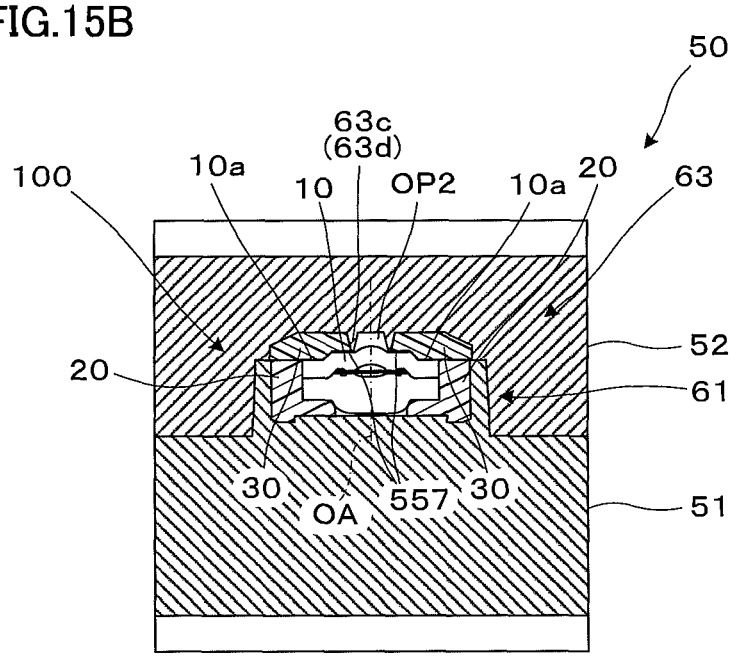

As illustrated in FIG. 15(A) and FIG. 15(B), a ring-shaped elastic body layer 557 is pasted on the surface close to the outer edge of the optical surface 11$d$ of the lens 10. The elastic body layer 557 possesses not only elasticity, but also heat resistance and chemical durability such that the elastic body layer does not undergo deformation or a change in properties as a result of the heat of the fluid resin MP.

As illustrated in FIG. 15(A) and others, when mold clamping is performed for the first mold 51 and the second mold 52 to form the cavity CA2 for the second holder member 30 in between the two molds, the fixing member 63$c$, which is a pressing member provided in the third molding portion 63 of the second mold 52, pushes the lens 10 on the first holder member 20 towards the lower side. Because the elastic body layer 557 is interposed between the projection 63$d$ of the fixing member 63$c$ and the frame portion 11$b$ of the lens 10, the impact caused by the contact of the fixing member (pressing member) 63$c$ is moderated, and the projection 63$d$ of the fixing member 63$c$ comes in intimate contact with the inner-most peripheral portion of the frame portion 11$b$ in the lens 10 over the elastic body layer 557. That is, the lens 10 is stabilized inside the cavity CA2 or the first holder member 20 without being damaged, and the generation of a play is prevented.

Eighth Embodiment

Next, a method for manufacturing an image pickup lens unit according to an eighth embodiment will be described. It should be noted that the method for manufacturing the image pickup lens unit according to the eighth embodiment is achieved by changing some parts of the method for manufacturing the image pickup lens unit 100 according to the first embodiment, and the parts that are particularly not described are those that are the same as the first embodiment.

Figure 16A:
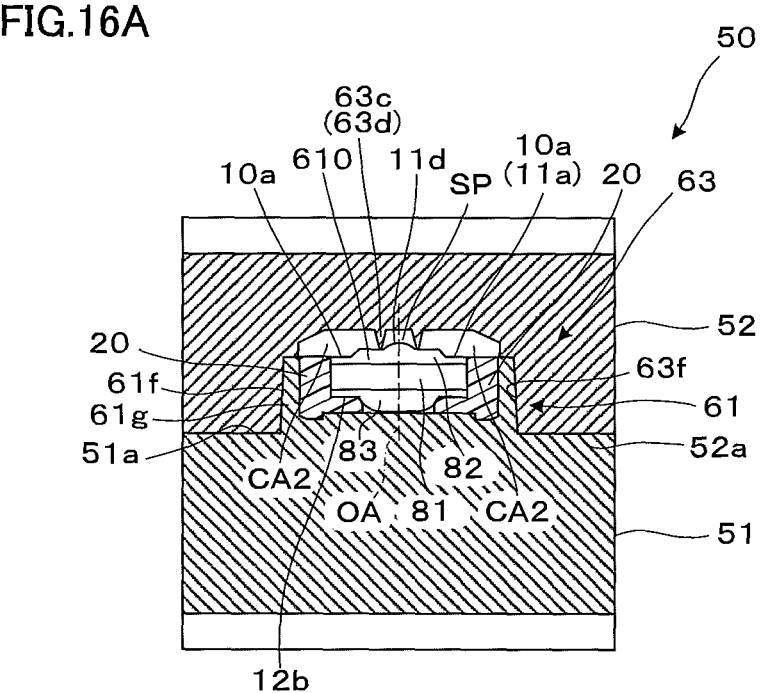
FIGS. 16(A) and (B) are diagrams for explaining a method for manufacturing an image pickup lens unit according to an eighth embodiment.
Figure 16B:
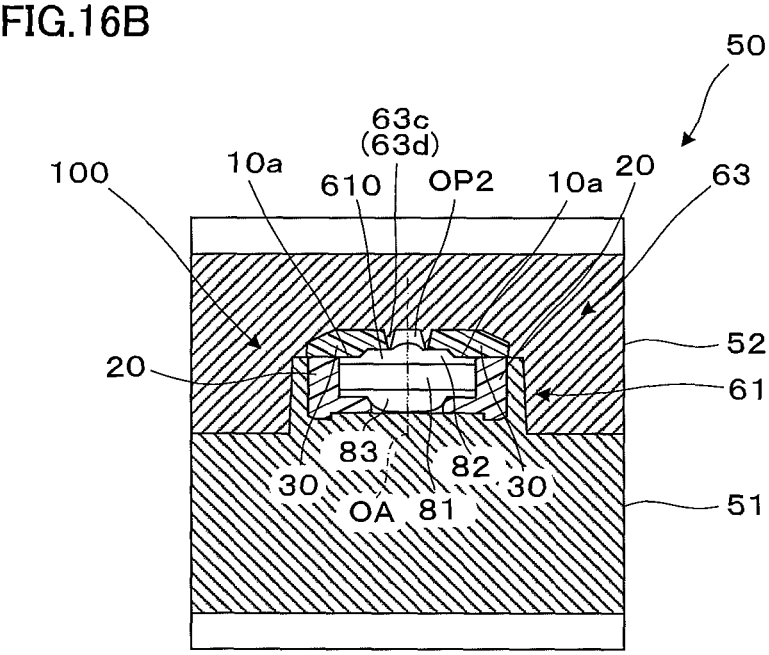

As illustrated in FIG. 16(A) and FIG. 16(B), a lens 610 is a composite lens or compound lens in which a glass substrate 81 is sandwiched by a resin-made first lens layer 82 and a second lens layer 83. The first lens layer 82 and the second lens layer 83 possess elasticity, and also possess heat resistance and chemical durability such that the lens layers do not undergo deformation or a change in properties as a result of the heat of the fluid resin MP.

In the present embodiment, the first holder member 20 fitted with the first molding portion 61 of the first mold 51 supports the frame portion 12$b$ of the lens layer 83, and the fixing member 63$c$, which is a pressing member provided in the third molding portion 63 of the second mold 52, fixes the lens 610 by coming in contact with the frame portion 11$b$ of the first lens layer 82.

As illustrated in FIG. 16(A) and others, when mold clamping is performed for the first mold 51 and the second mold 52 to form the cavity CA2 for the second holder member 30 in between the two molds, the fixing member (pressing member) 63$c$ provided in the third molding portion 63 of the second mold 52, pushes the lens 610 on the first holder member 20 towards the lower side. Because the lens layers 82 and 83 possess elasticity, the projection 63$d$ of the fixing member 63$c$ comes in intimate contact with the inner-most peripheral portion of the frame portion 11$b$ in the lens 610. That is, the lens 610 is stabilized inside the cavity CA2 or the first holder member 20 without being damaged, and the generation of a play is prevented.

Ninth Embodiment

Next, a method for manufacturing an image pickup lens unit according to a ninth embodiment will be described. It should be noted that the method for manufacturing the image pickup lens unit according to the ninth embodiment is achieved by changing some parts of the method for manufacturing the image pickup lens unit 100 according to the first embodiment, and the parts that are particularly not described are those that are the same as the first embodiment.

Figure 17A:
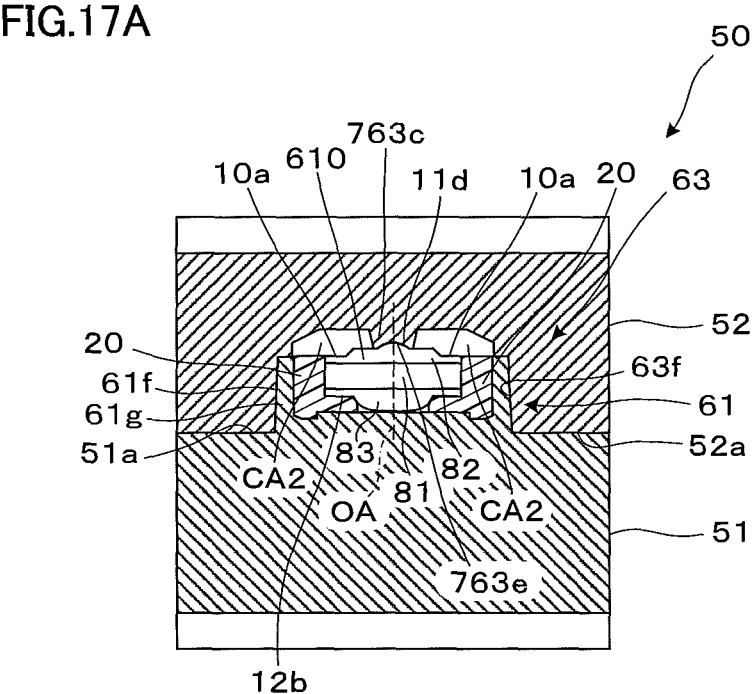
FIGS. 17(A) and (B) are diagrams for explaining a method for manufacturing an image pickup lens unit according to a ninth embodiment.
Figure 17B:
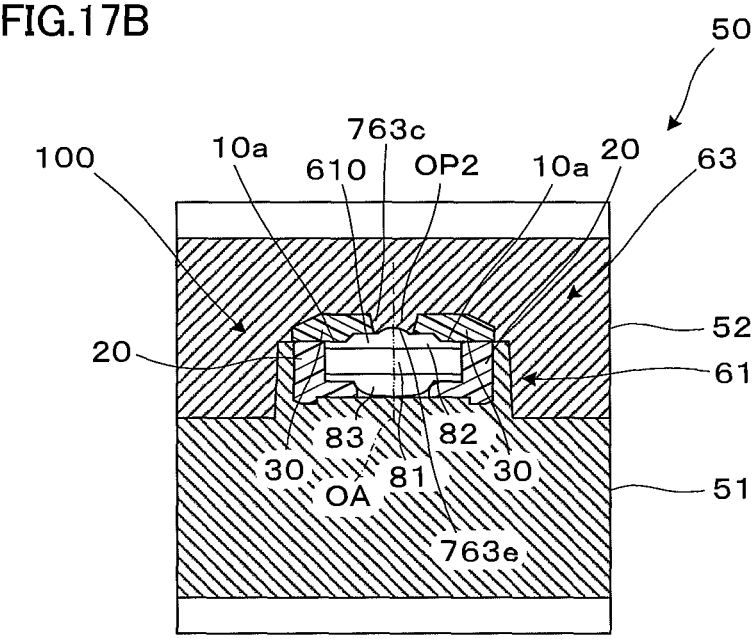

As illustrated in FIG. 17(A) and FIG. 17(B), same as in the case of the eighth embodiment, the lens 610 is a composite lens in which the glass substrate 81 is sandwiched by the resin-made first lens layer 82 and the second lens layer 83.

In the second mold 52, a fixing member 763$c$, which is a pressing member provided in the third molding portion 63, is a columnar projection, and an end surface 763$e$, which is the contact surface, has the same or almost the same curvature as the optical surface 11$d$ of the lens 610. If the optical surface 11$d$ does not have a uniform curvature, or is aspherical, the end surface 763$e$ is set to the same shape or almost the same shape as the optical surface 11$d$.

As illustrated in FIG. 17(A) and others, when mold clamping is performed for the first mold 51 and the second mold 52 to form the cavity CA2 for the second holder member 30 in between the two molds, the fixing member (pressing member) 763$c$ provided in the third molding portion 63 of the second mold 52, pushes the lens 610 on the first holder member 20 towards the lower side. Because the lens layers 82 and 83 possess elasticity, the end surface 763$e$ of the fixing member 763$c$ at the side of the third molding portion 63 comes in intimate contact with the optical surface 11$d$ in the lens 610. That is, the lens 610 is stabilized inside the cavity CA2 or the first holder member 20 without being damaged, and the generation of a play is prevented.

Tenth Embodiment

Next, a method for manufacturing an image pickup lens unit according to a tenth embodiment will be described. It should be noted that the method for manufacturing the image pickup lens unit according to the tenth embodiment is achieved by changing some parts of the image pickup lens unit 100 and the method for manufacturing the same according to the first embodiment, and the parts that are particularly not described are those that are the same as the first embodiment.

Figure 18:
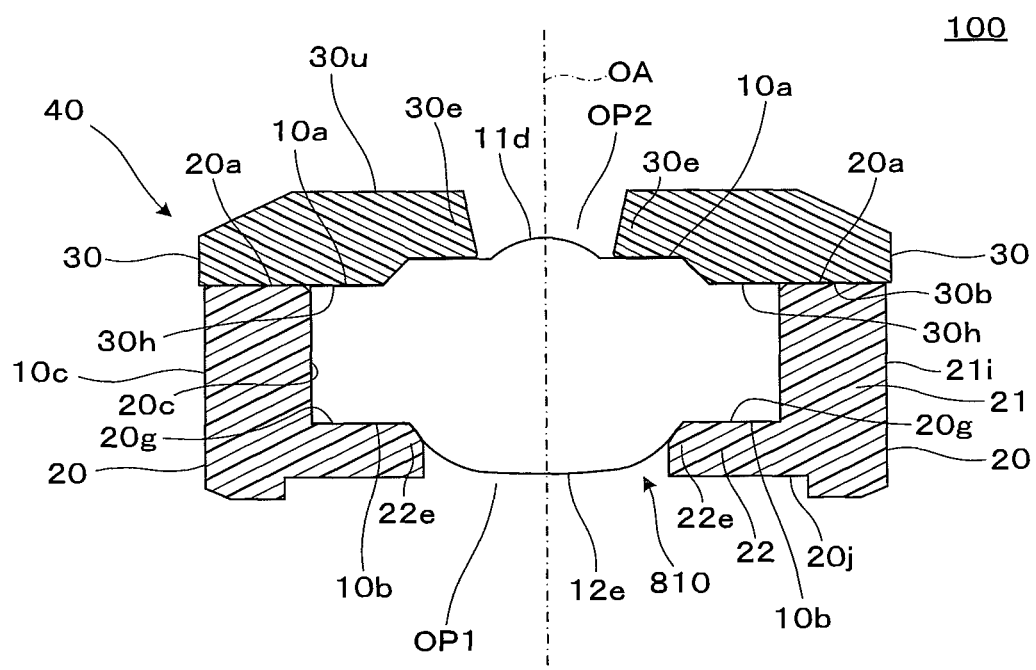
FIG. 18 is a cross-sectional view for explaining an image pickup lens unit according to a tenth embodiment.

As illustrated in FIG. 18, a lens 810 is a single lens component, which is formed from resin, glass, or a compound thereof. In such a case, the production of the lens 810 becomes relatively easy.

If the lens 810 described above is made from a resin, the lens 810 can also be formed using the mold device 50.

Figure 19:
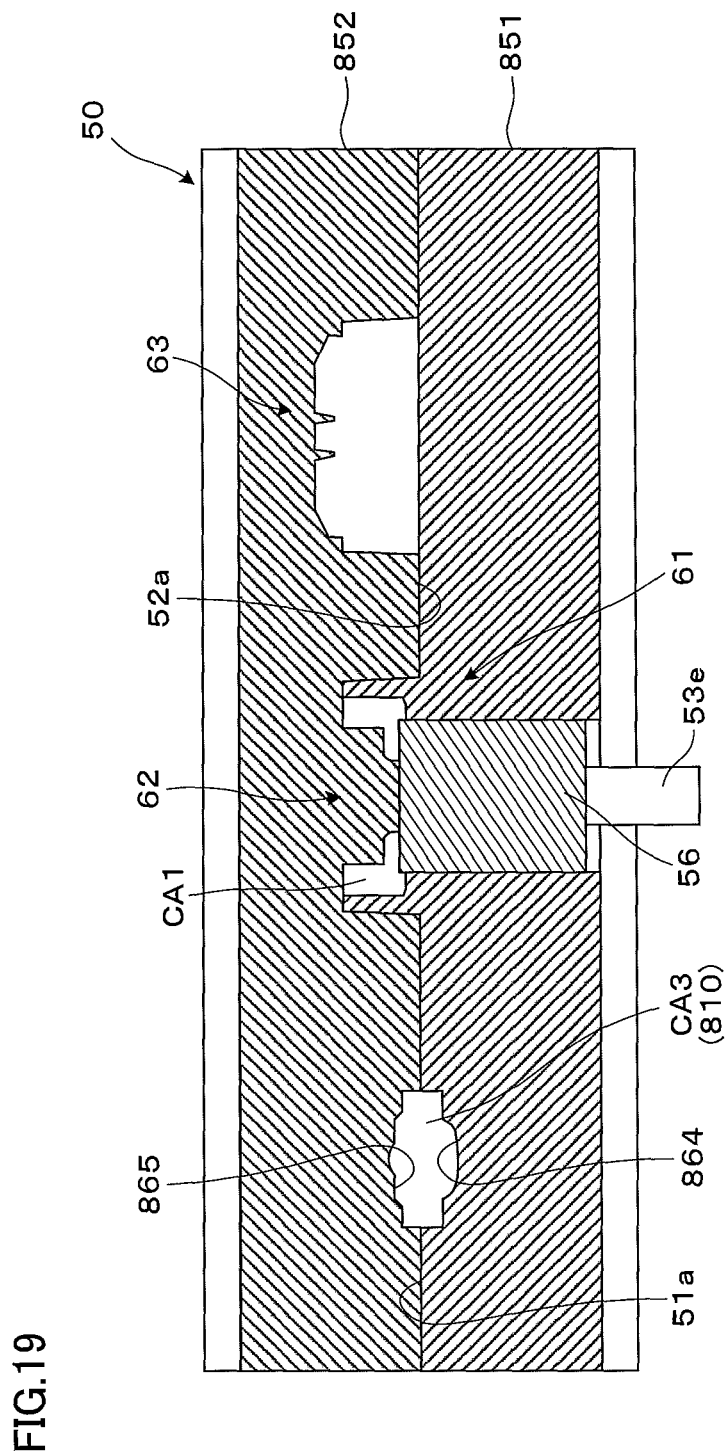
FIG. 19 is a diagram for explaining the method for manufacturing the image pickup lens unit according to the tenth embodiment.

FIG. 19 is a diagram explaining an example of a method of manufacturing the lens 810. The mold device 50 includes a first mold 851 at the fixed side and a second mold 852 at the movable side. In the first mold 851, the first molding portion 61 for molding the first holder member 20, and a fourth molding portion 864 for molding the lens are provided. In the second mold 852, the second molding portion 62 for molding the second holder member 20, the third molding portion 63 for molding the second holder member 30 and for holding the first holder member 20, and a fifth molding portion 865 for molding the lens are provided. A resin filling port (not illustrated in the figure) is provided in at least one of the first molding portion 61 and the second molding portion 62, at least one of the fourth molding portion 864 and the fifth molding 865, and in the third molding portion 63. Because the configuration of the first molding portion 61 through the third molding portion 63 is the same as that in the first embodiment, the detailed description is omitted. For example, the mold portion 56 can be replaced by an alternative in the second embodiment and thereafter.

By moving the second mold 852 to a molding position where the fourth molding portion 864 and the fifth molding portion 865 are facing each other, and then performing mold clamping thereof, a third cavity CA3 for the lens 810 is formed by the fourth molding portion 864 and the fifth molding portion 865 between the first mold 851 and the second mold 852. The above molding position is also the position for molding the first holder member 20 (first molding position), and along with the formation of the cavity CA3 for molding the lens, the first cavity CA1 for forming the first holder member is also formed. Further, the lens 810 is molded by filling and solidifying a resin in the third cavity CA3 for lens molding. Furthermore, the first holder member 20 is molded by filling and solidifying a resin in the first cavity CA1.

Next, the mold is opened, and the lens 810 is separated from the first mold 851. By withdrawing the second mold 852 while holding the lens 810 in the second mold 852, the eject mechanism (not shown in the figure) present in the second mold 852 is used to separate the lens 810 from the second mold 852 and insert in the depression RE of the first holder member 20. Following this, the third molding portion 63 of the second mold 852 is moved to a position facing the first molding portion 61 of the first mold 851, both molding portions are fitted together (that is, set at the second molding position), mold clamping is performed again, and by filling and solidifying a resin in the second cavity CA2, the second holder member 30 is molded. In this way, the first holder member 20 and the second holder member 30 are welded, and the image pickup lens unit 100 in which the lens 810 is stored in the holder 40 and fixed, is thus completed. It should be noted that by filling the resin in the third cavity CA3 together with the molding of the first holder member 20, a new lens 810 can be molded in parallel with the molding of the first holder member 20. Therefore, by repeating the above steps, a large number of image pickup lens units 100 can be manufactured in a short period of time. Furthermore, because the molding space for molding the lens 810 is provided at a location separate from the molding space for molding the holder 40 of the mold, the space required for the device for manufacturing the image pickup lens unit 100 can be saved.

The present invention was described based on the embodiments above, however, the present invention is not restricted to the above embodiments.

For example, in each of the embodiments above, the positioning of the lens was performed by using the edge portion 22e of the first holder member 20 and the inner wall surface of the first holder member 20, however, in addition to these, or in place of these, the fixing members (pressing members) 63c, 463c, and 763c of the second mold 52 and a second mold 152 can also be used as positioning members.

Furthermore, in the above embodiments, a thermoplastic resin was used as the resin material configuring the holder 40, however, the present invention is not limited thereto, and curable resins such as thermoplastic resins and light-curable resins can be used.

Also, a plurality of molding portions may be provided in the mold, and the holder 40 may be molded simultaneously for a plurality of lenses. In such a case, the members for the alignment of the two molds need not be arranged in each molding portion, and by providing taper pins in a lesser number than the number of molding portions, as well as fitting holes for fitting with the taper pins in each mold, common alignment members may be used for a plurality of molding portions.

The invention claimed is:

1. A method for manufacturing an image pickup lens unit including a lens having a first surface on which a first optical surface is formed and a second surface on which a second optical surface is formed on the opposite side of the first surface, a first holder member, and a second holder member configured to hold the lens so as to store the lens in cooperation with the first holder member, the method comprising:

a first molding step of filling in a resin material in a mold and molding the first holder member having a positioning portion that is in contact with the second surface of the lens;

a positioning step of inserting the lens in the first holder member present in the mold, and positioning the lens by bringing the lens in contact with the positioning portion of the first holder member; and a second molding step of bringing the lens and the mold in contact by an elastic biasing force at a time of fixing the lens from a side of mold, filling in a resin material in the mold when the lens has been positioned and fixed with respect to the first holder member, and then molding the second holder member such that the second holder member is welded to the first holder member placed inside the mold and having the lens positioned therein, the second holder member being configured to prevent the lens from falling off.

2. The method for manufacturing the image pickup lens unit according to claim 1, wherein at least one of the positioning portion and a pressing member provided in the mold to press the first surface of the lens for fixing has an elastic portion configured to come in contact with at least a part of the first and the second surfaces of the lens and undergo elastic deformation.

3. The method for manufacturing the image pickup lens unit according to claim 2, wherein the positioning portion is configured to be displaced by facing a withdrawal space provided in a main body of the mold after the first molding step.

4. The method for manufacturing the image pickup lens unit according to claim 2, wherein the positioning portion is supported by a member configured to be displaced elastically with respect to a main body of the mold.

5. The method for manufacturing the image pickup lens unit according to claim 1, wherein a pressing member provided in the mold to press the first surface of the lens for fixing has an elastic member configured to come in contact with at least a part of the first surface and undergo elastic deformation.

6. The method for manufacturing the image pickup lens unit according to claim 1, wherein a pressing member provided in the mold to press the first surface of the lens for fixing is configured to be displaced elastically with respect to a main body of the mold.

7. The method for manufacturing the image pickup lens unit according to claim 1, wherein a pressing member provided in the mold to press the first surface of the lens for fixing is configured to support the first surface via a surface protection layer that covers at least a part of the first surface and undergoes elastic deformation.

8. The method for manufacturing the image pickup lens unit according to claim 1, wherein at least a part of the lens is formed by an elastic material configured to undergo elastic deformation, and the pressing member provided in the mold to press the first surface of the lens supports at least one of the first optical surface and a remaining surface region excluding the first optical surface from the first surface.

9. The method for manufacturing the image pickup lens unit according to claim 8, wherein the first surface is supported by a contact surface having substantially the same shape as the first optical surface.

10. The method for manufacturing the image pickup lens unit according to claim 1, wherein the first holder member has a contact surface facing the periphery or vicinity of the second optical surface of the lens.

11. The method for manufacturing the image pickup lens unit according to claim 1,
wherein the lens is either a single lens component or a lens assembly which is an integrated combination of a plurality of lens elements.

12. The method for manufacturing the image pickup lens unit according to claim 11, wherein the lens assembly is an integrated combination of a plurality lens elements and a stop interposed between the plurality of lens elements.

13. The method for manufacturing the image pickup lens unit according to claim 1, wherein the lens has rectangular prism-like side surfaces.

14. The method for manufacturing the image pickup lens unit according to claim 1, wherein a molding space for molding the lens is provided at a position different from the molding space for molding the holder member, in the mold.

15. The method for manufacturing the image pickup lens unit according to claim 1, wherein the holder member and the lens are formed from a reflow heat-resistant material.

16. The method for manufacturing the image pickup lens unit according to claim 1, wherein movement of the lens is prevented by sucking in the lens from the mold side in a state where the lens is positioned by the positioning member.

* * * * *